US007639907B2

(12) United States Patent
Elberbaum

(10) Patent No.: US 7,639,907 B2
(45) Date of Patent: Dec. 29, 2009

(54) METHOD AND APPARATUS FOR OPERATING AC POWERED APPLIANCES VIA VIDEO INTERPHONES, TWO WAY IR DRIVERS AND REMOTE CONTROL DEVICES

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 265 days.

(21) Appl. No.: 11/939,785

(22) Filed: Nov. 14, 2007

(65) Prior Publication Data

US 2009/0121842 A1 May 14, 2009

(51) Int. Cl.
*G02B 6/28* (2006.01)

(52) U.S. Cl. ........................... 385/24; 385/15; 398/106; 398/112

(58) Field of Classification Search ................... 385/15, 385/24; 398/106, 112
See application file for complete search history.

(56) References Cited

U.S. PATENT DOCUMENTS

| | | | | |
|---|---|---|---|---|
| 4,592,360 | A * | 6/1986 | Lesnick | 607/60 |
| 5,142,397 | A | 8/1992 | Dockery | |
| 5,923,363 | A | 7/1999 | Elberbaum | |
| 6,239,718 | B1 | 5/2001 | Hoyt et al. | |
| 6,603,842 | B2 | 8/2003 | Elberbaum | |
| 6,940,957 | B2 | 9/2005 | Elberbaum | |
| 7,290,702 | B2 | 11/2007 | Elberbaum | |
| 7,548,246 | B2 * | 6/2009 | Huang et al. | 345/600 |
| 2005/0273820 | A1 | 12/2005 | Elberbaum | |

FOREIGN PATENT DOCUMENTS

| | | |
|---|---|---|
| KR | 10-2004-0068433 | 7/2004 |
| KR | 10-2005-0081505 | 8/2005 |
| KR | 10-2006-0031134 | 4/2006 |
| WO | 2005/025189 | 3/2005 |

OTHER PUBLICATIONS

Written Opinion of the International Searching Authority and a International Search Report dated Mar. 27, 2009 for corresponding International Application PCT/US2008/083345.

Specification, claims and abstract of U.S. Appl. No. 11/509,315, filed Aug. 24, 2006.

Specification, claims and abstract of U.S. Appl. No. 11/874,309, filed Oct. 18, 2007.

* cited by examiner

*Primary Examiner*—Jennifer Doan
(74) *Attorney, Agent, or Firm*—Katten Muchin Rosenman LLP

(57) ABSTRACT

A method for coupling at least one of a wall mount and a ceiling mount adjustable IR driver with a two way IR network of a home automation system controlled by a main controller selected from a group comprising a dedicated controller, a video interphone and a shopping terminal, the IR driver includes a plurality of adjustable IR transmitters and at least one IR receiver for propagating IR commands to at least one of hand held IR remote control units, electrical appliances and devices selected from a group comprising a remotely operated relays, an AC current sensors and a keypads, and for receiving from at least one of the devices a status data, said IR commands include at least a power on-off command for switching an appliance on and off and the status data pertaining to the on and off statuses of a commanded appliance.

21 Claims, 10 Drawing Sheets

FIG. 3A
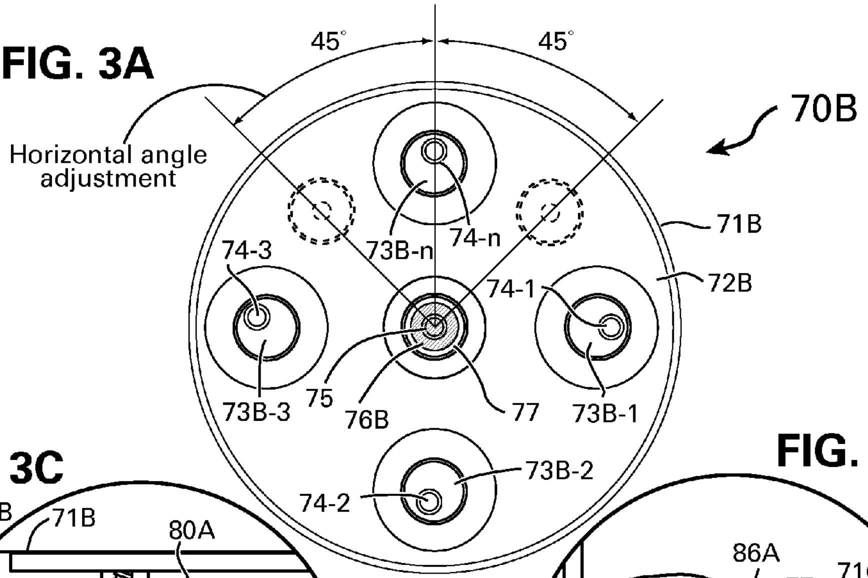
FIG. 3C
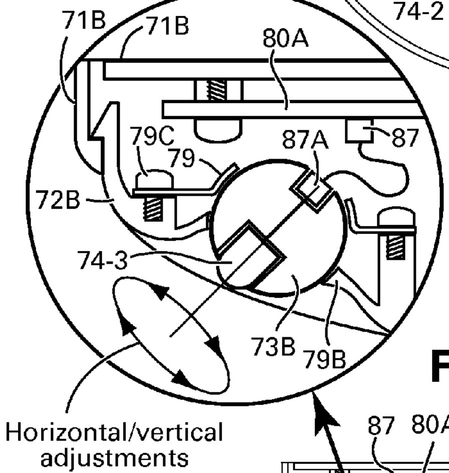
FIG. 3D
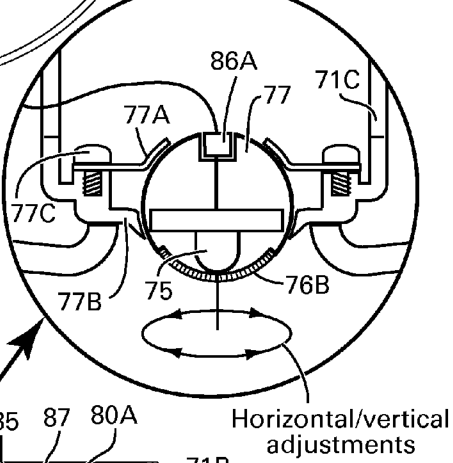
FIG. 3B
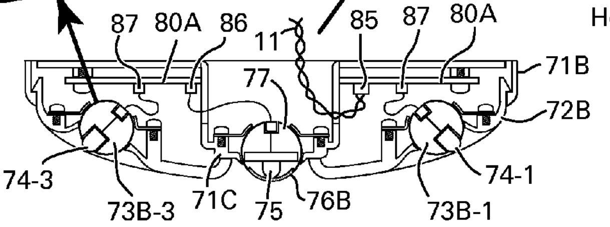
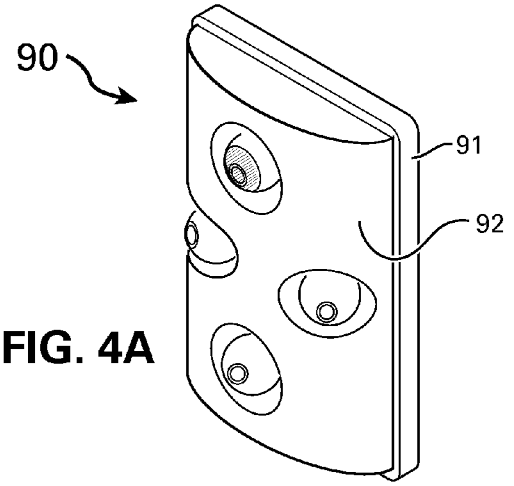
FIG. 4A
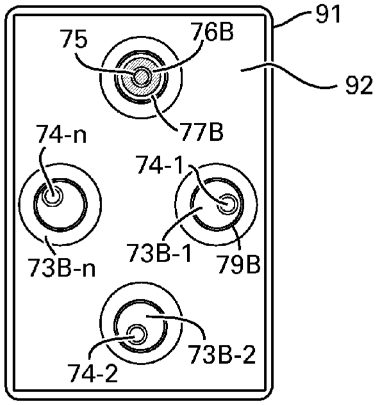
FIG. 4B FIG. 7A
FIG. 7B
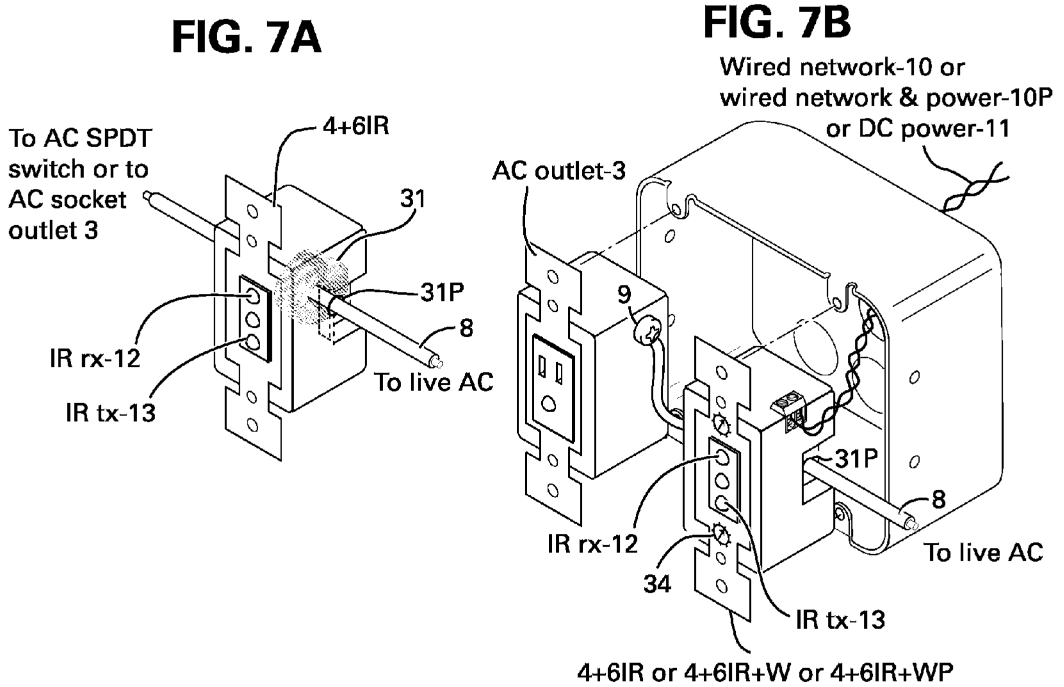
FIG. 8A
FIG. 8B
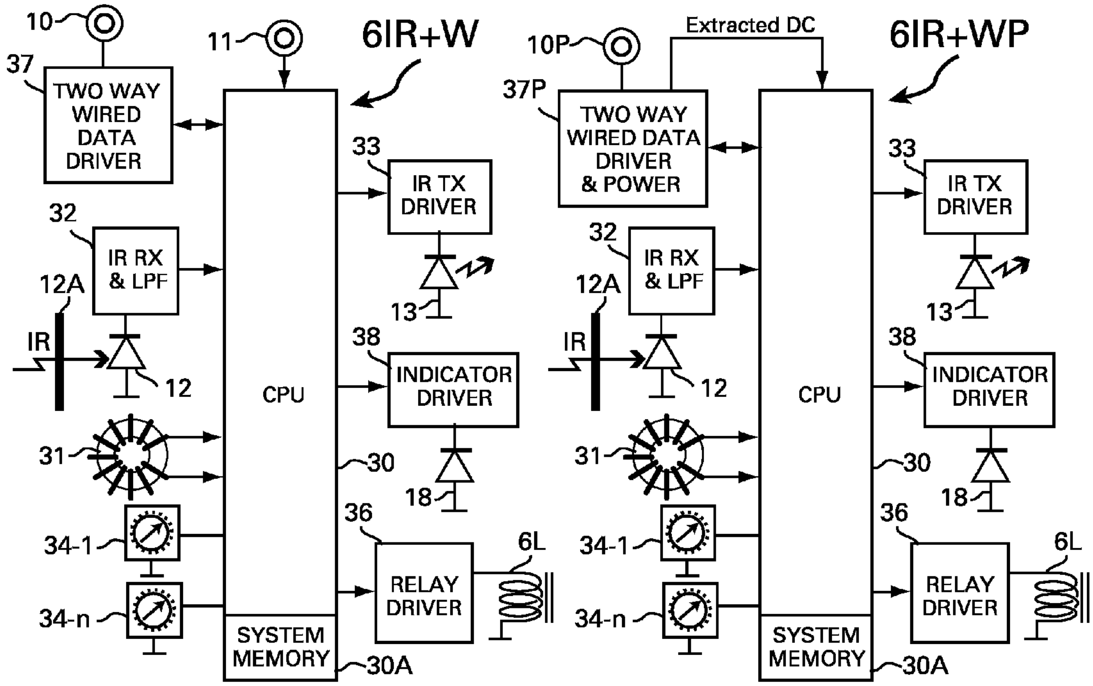

METHOD AND APPARATUS FOR OPERATING AC POWERED APPLIANCES VIA VIDEO INTERPHONES, TWO WAY IR DRIVERS AND REMOTE CONTROL DEVICES

BACKGROUND OF THE INVENTION

1. Field of the Invention

This invention is related to video interphone system and to wired or wireless control, including IR and RF, used for remotely operating AC switches and AC powered electrical devices and appliances.

2. Description of the Prior Art

Wired or wireless remote control devices including Infra-Red (IR) or RF transmitter for remotely operating AC powered electrical appliances such as television receivers, home heaters, air conditioners, motorized curtains, lighting and other electrical appliances in homes, apartments, offices and buildings in general are switched on and off by a one way control or command signal, with the person operating the remote control device verifying the on or off status of the operated device by visual means, such as the TV is on, or the lights are off, or the air condition unit is activated or not, by being at the site of the operated appliance. Most of the remote control devices, including IR or wireless remote control devices use the same power key to switch the appliance on and off, therefore without the operating person's self verification on site, with most of currently available remote control devices it is impossible to positively verify the on-off power status without being at the appliance site.

On the other hand home automation relay devices, operated via two way communication signals can be updated with the relay's status by a returned status signal. The problem such system represents is the cost for customizing of the AC electrical wiring, coupled with the on-off switching devices which are expensive and require expertise to configure, install and setup. One reason is that the wiring systems that are used for the light's (or other appliances) on-off switches do not include the neutral wire of the AC mains. The commonly wired electrical systems provide only two wires for the switches, the AC live or hot wire and the load wire that leads to the light fixture or other appliance. Similar two only traveler wires are used for connecting several switches that are tied up to switch on-off the same light or other appliance.

The "two only AC wires" with no neutral wire at the switch's electrical box, prevent simple introduction of home automation, requiring changes to the commonly used electrical wiring, and to the wide range of commonly used electrical AC switches and the AC outlets that are offered in large variety of shapes, designs and colors. The introduction of new electrical wirings and new switches and outlets to replace the currently available electrical switches and outlets is complicated, time consuming, troublesome and costly.

Moreover, AC power devices that are directly connected to live AC power lines within the buildings must be tested to comply with electrical safety laws, rules and regulation and obtain approval and certification by organizations such as the UL in the USA, VDE or TUV in Europe, BS in the UK and similar organizations in other countries. The testing and approval processes are costly and time consuming, which makes approvals of customs designed AC electrical switches, AC electrical outlets and AC electrical interfaces for home automation out of reach to the mass market, limiting the proliferation of the much needed home automation to only custom designed AC switches, outlets and interfaces, for use in very expensive homes.

The significance with remote controlling of home automation systems is the ability to switch electrical appliances on and off remotely via PCs through the Internet, via mobile telephones and/or via other PDA devices. The problem however for such remote controlling is the need for a verified on-off status of the appliances being operated and/or the availability of a status report covering all the remotely controlled appliances of a given house, office, apartment or a building. Many existing home automation systems and devices operate over wired or wireless home network, using variety of complex communication protocols, such as the known X10 protocol via AC power line, as well as currently being formulated "Zigbee" standard for wireless communications and/or other Bluetooth communications through a single controller, or plurality of controllers, including control devices such as keypads and/or LCD displays and/or touch screen devices. Similarly, such method and apparatuses for integrating remote control devices with video interphone systems and shopping terminals are also disclosed in U.S. Pat. No. 7,290,702 dated Nov. 6, 2007, U.S. application Ser. No. 11/509,315 dated Aug. 24, 2006 and U.S. application Ser. No. 11/874,309 dated Oct. 10, 2007 (applied concurrently).

As explained in the above referenced U.S. applications, most of all television, home theater and sound equipment are operated by a dedicated, individually coded as programmed by the different manufactures, none of which is compatible with other appliances or between manufacturers. Further, literally all the dedicated IR remote control devices generate one way commands to the appliance, incorporating no IR receiver for a returned confirmation. This combination of non compatibility in commands, codes, protocols, frequencies and others on one hand, and with no receiving function to confirm the basic on-off status of the appliance on the other, makes it impossible to integrate standard appliances into an error free home automation system operated from a distance, such as via the Internet.

Similarly, known universal IR remote control devices that are offered in the market for controlling different electrical appliances contain the codes and other particulars of a long list of appliances by the different manufacturers. Some of the universal remote control devices include an IR receiver for recording the codes of a device not included in the universal remote control original program, but not for receiving a return code from the appliance itself. Moreover, the known appliances do not include an IR transmitter to generate return confirmation, such as an executed command, nor do the appliances provide an on-off or other AC current drain status data via IR or other communications.

SUMMARY OF THE INVENTION

It is an object of the present invention to provide a simplified method and apparatus for incorporating adjustable ceiling and wall mounted two way IR transceiver, along with a complimentary two way hand held IR remote control device for communicating with the different appliances in conjunction with electrical relays and AC current on-off sensing devices as disclosed in the U.S. application Ser. No. 11/874,309 dated Oct. 10, 2007. Another object of the present invention is to operate and monitor the status of the electrical appliances through video interphones and/or "shopping terminals" including the generating of the control codes and signals from the video interphones and shopping terminals to the different appliances through a driver circuits as described in the above referenced U.S. Pat. No. 7,290,702 and application Ser. No. 11/509,315. "Shopping terminals" are disclosed in the U.S. application Ser. No. 10/864,311 dated Jun. 8, 2004 and PCT international application PCT/US05/19564 dated Jun. 3, 2005 for a method and apparatus for simplified e-commerce shopping via home shopping terminals. Video interphones systems are disclosed in U.S. Pat. Nos. 5,923,363, 6,603,842 and 6,940,957.

In the following description the term live AC refers to the "hot line" of the AC power or mains, as oppose to the neutral line of the AC power or mains. The term load refers to an appliance such as light fixture that is connected between the neutral line and the live AC line via the on-off switch.

The apparatus for remotely operating AC powered appliances and other objects of the present invention are attained by IR drivers and IR remote control devices in combination with add on devices comprising wired, IR or RF receivers including AC power relays for receiving one way operational commands to operate the electrical appliances and/or wired, IR or RF transceivers including AC power relay and AC current sensors for receiving one way operational command to operate the electrical appliances and for transmitting on-off status signals from the appliances, in response to the received operational command or in response to an inquiry command (a request for status data) on the basis of the current sensor output, thereby providing error free remote controlling of the electrical home appliances. Such add-on devices are fully disclosed in the U.S. patent application Ser. No. 11/874,309 dated Oct. 18, 2007 that are concurrently applied.

The solution offered by the disclosed invention, is to install an add on devices that include relays and current sensors, packaged or encapsulated with said wired, IR or wireless receiver or transceiver into a standard size casing of an AC switch or outlet, and using such packaged "add on device" to augment any type of standard manual on-off switch for electrical appliances or lighting and not by replacing the whole existing electrical switches and wiring.

The method of adding packaged relays and/or current sensors interfaces to an existing standard electrical switches and outlets instead of replacing them as disclosed in the U.S. application Ser. No. 11/874,309, introduces several major advantages; one is the lowering of the overall cost of the switches and outlets, because standard low cost, mass produced switches and outlets can be used. The second advantage is that the "add on devices" provide dual parallel operations, manual operation via the commonly used switches and outlets and remote operation via the relays of the add on devices. These advantages are the other objects of present invention, attained with total harmony and with no conflict between the manual and remote switching operation as described further below.

As explained above, the use of SPDT and the "reversing" DPDT relays in the "add on devices" of the disclosed U.S. patent application Ser. No. 11/874,309, or in other existing home automation electrical relay, switches and outlets, it will not be possible to identify the on-off status of the appliance, unless the data pertaining all the switches and relays of a given circuit are communicated to the controller. This mandates the inputting of data pertaining all the switches and relays of the electrical circuits of a given system to the controller at the time of installation, which is complicated, troublesome and prone to errors. This calls for complex data handling and ensuing operational complications, requiring the re-configuration of all the data every time a manual switch or a relay is activated and this in return introduces substantial more data traffic and processing.

For this reason the important object of the disclosed U.S. patent application Ser. No. 11/874,309 is the introduction of AC current sensor for identifying when an appliance is switched on. It is important to note that the connecting of live AC power line to an electrical circuit calls for the use of large size electrical components, such as high voltage AC capacitors, and as explained in the U.S. application disclosed above, mandates a compliance with the electrical safety laws, rules and regulations, including the testing and certification by organization such as the UL in the U.S., which is costly and time consuming. Therefore the current sensor is not connected to the AC line, instead the current is detected by AC induction. For this reason the AC switches and outlets are provided with a structural passage for the AC electrical wire to pass through an opening in a coil assembly for detecting the current drain through the AC wire running through the sensors.

A toroidal or other structured coil having an opening for enabling the AC wire to pass through, so that the current drain in the AC power wire will generate a corresponding signal level at the coil output terminals. For such induction current sensing the coil does not need to be connected to any live AC line, while its output signal is dependent upon the AC current through the AC wire. The coil output is processed by a signal detecting circuit and the CPU of the "add on devices" for generating the on-off status data.

The add-on devices of the disclosed invention includes a transceiver for receiving commands to operate the relays and for transmitting in return the data pertaining the on or off status of the appliance. On the basis of the level of the AC current fed through the current sensing coil, said on status may include more than a simple on data. For example, an AC outlet for a TV receiver or a PC that are in a sleeping mode and consume smaller current than the full operating current, will cause the current sensing coil to output lower sensing signal level, which can be measured by the signal detecting circuit and processed by the CPU of the transceiver to generate a sleeping mode status data.

The received and transmitted data are fed via a communication network selected from a group consisting of wired network, two way IR network, RF wireless network and combinations thereof. For example a television receiver can be powered via a standard AC outlet, with the AC wire connecting to the AC outlet for the television receiver passes through said add-on current sensor, while the power on command to the television may be transmitted via an hand held IR remote control or via an IR driver of the present invention and also described in above U.S. referenced application Ser. No. 11/509,315 and/or through the video interphone described in U.S. Pat. Nos. 6,603,842 and 6,940,957 and/or the shopping terminal disclosed in U.S. application Ser. No. 10/864,311.

The transceiver of the add-on current sensor through which the AC power is fed to the television receiver, transmits to the home automation controller, the video interphone or the shopping terminal, in return to a power-on command to the television receiver, a reply that a power-on is detected using the wired, IR or the RF wireless network employed for the home automation, thereby updating the home automation controller, or said video interphone or the shopping terminal described in the above referenced patents and applications, with the television "on status", or "off status" if the command was to switch off the television.

The updating data of all the appliances in a given room or area covered by an IR transceiver/driver can be communicated between such an adjustable IR driver and a hand held IR control device of the present invention which includes IR receiver and indicators or LCD device to indicate the statuses of the appliances.

Another object of the present invention is to use the two way IR communication in conjunction with the add on relays and the current sensor of the AC outlets, to effectively close the missing link between AC operated appliances that are remotely activated by IR remote control devices, but do not provide a return command confirmation or status to the remote control device, nor to the home automation controller, including the video interphone and the shopping terminal. This is achieved by the use of a low cost two way IR remote control devices and two way adjustable IR drivers, employing common codes adapted for the entire appliances of a given system including lighting and other AC on-off operated devices and all the IR activated electronic appliances, by providing a simple look up table programmed for the home automation controller, which converts the received common codes into the codes as used for the non compatible, individual appliances that are located in the different rooms or areas of the home, on the basis of an allotted code to a given room or area in the home, office or building and the code allotted to each individual appliance as programmed by using the adjustable IR driver to optically direct the IR command to the appliances as programmed.

The reference to home automation controller hereafter is to a display device with control keys or touch screen and circuits similar to the video interphone and/or the shopping terminal disclosed in the applications and the US patents referred to above.

BRIEF DESCRIPTION OF THE DRAWINGS

The foregoing and other objects and features of the present invention will become apparent from the following description of the preferred embodiments of the invention with reference to the accompanying drawings, in which:

FIGS. 3A~3D are structural drawing of another adjustable ceiling mount IR driver of the preferred embodiment of the present invention;

FIGS. 4A and 4B are an illustration and front drawing of an adjustable wall mount IR driver of the preferred embodiment of the present invention;

FIGS. 7A and 7B are an illustration and exploded view showing the installation of the AC current sensor along with an AC outlet of the preferred embodiment of the invention;

FIGS. 8A and 8B are block diagrams of the relay control and communication circuits including the current sensor of the preferred embodiment of the invention;

DETAILED DESCRIPTION OF THE PREFERRED EMBODIMENTS

Figure 1:
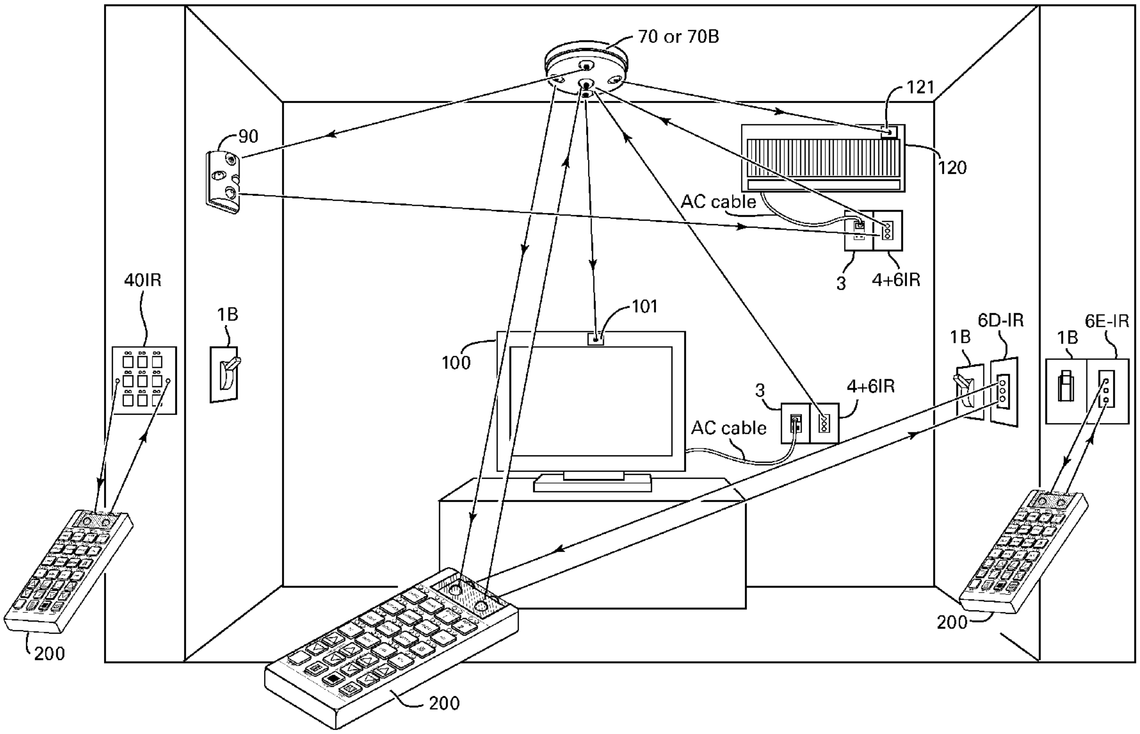
FIG. 1 is an overview illustration of an home automation system in combination with two way IR remote control, for operating electrical appliances, relays and current sensors of the preferred embodiment of the present invention.

Shown in FIG. 1 is an IR network of an home automation system that includes electrical switches for operating electrical appliances, such as light fixtures (not shown), a television set 100 and an air conditioner 120. The AC power cables of both the television set 100 and the air conditioner 120 are shown connected to AC outlets 3 with each of the outlets is adjacent to an AC current sensor unit 4+6IR for detecting the on-off status of the television set 100 and the air conditioner 120 individually. The electrical on-off switches 1B shown in FIG. 1 are the well known standard single pole dual throw (SPDT) switches also known as "switch over" that are commonly used for operating a given appliances such as light fixture (not shown) from two separate locations. Two of the three SPDT switches 1B shown are adjacent to an add on relay units 6D-IR and 6E-IR.

The relay units also include an AC current sensor for detecting the on-off status of the operated AC appliance. The current sensors 4+6IR and the relay units 6D-IR and 6E-IR are shown in FIGS. 6A, 6B, 7A and 7B respectively are disclosed in the U.S. patent application Ser. No. 11/874,309, filed concurrently on Oct. 18, 2007 and is attached by reference. The relay units 6D-IR and 6E-IR switch the connected AC appliance on and off in parallel with the manual switch 1B or the manual reversing DPDT switch 1C (shown in details in the U.S. patent application Ser. No. 11/874,309) with no conflict, whereby each individual manual switch 1B or 1C and each individual relay 6D-IR and 6E-IR can operate its connected appliance independently, as if it was the only on-off switch connected to the appliance. In addition each of the relays 6D-IR and 6E-IR and the current sensor units 4+6IR, will independently output to the IR network, or to a wired network, or to an RF wireless network that are explained later, a data relating to the on-off status of the appliance on the basis of the current drain through the AC wire fed through the relay 6D-IR, 6E-IR or through the current sensor 4+6IR via the AC outlet 3.

The remote control device 200 and 200A shown in FIGS. 1 and 5A~5D includes n number of keys K and indicators 18 and/or an LCD panel 204 with touch screen 205 for operating AC appliances including the shown television set 100 and the air conditioner 120 and for indicating the on-off statuses of the addressed appliance or as explained later, all the appliances in a given room or areas, or of selected appliances including appliances that are remotely operated by the IR remote control device 200 through the home automation controller, the video interphone monitor or the shopping terminal.

The IR remote control device 200 is shown in FIG. 1 to communicate two way with the keypad 40IR, with the relay 6D-IR and with the relay 6E-IR for operating the respective AC appliances and for receiving the data pertaining the on-off statuses of the operated appliances. As shown in FIGS. 5A~5D the remote control devices 200 and 200A include two IR photo diode receivers 12 and two IR LED transmitters 13, with one each transmitter and receiver is directed forward for aiming the remote control device toward the appliance under control and one each directed upwards for communicating with the ceiling mounted IR driver 70 or 70B shown in FIGS. 1, 2A and 3A respectively.

Simultaneously, the IR ceiling driver 70 or 70B are shown communicating with the IR receivers of the television set 101 and of the air conditioner 121. The IR receiver of the current sensor 4+6IR connected to the outlet 3 that feed the AC power to the air conditioner 120 communicate with the wall mounted IR driver 90 shown also in FIGS. 4A and 4B. The ceiling mounted IR driver is further shown communicating with the current sensor 4+6IR of the outlet 3 that powers the television set 100 and with the remote control device 200.

As explained above and in the concurrent U.S. patent application Ser. No. 11/874,309 the shown IR network provides for a two way data communication within the confined room or area, covering any and all appliances and devices that are in line of sight or optically connected. Moreover as IR beams, similar to light beams, can be reflected by mirrors or by diffused surfaces, it is possible to provide some limited extension to an adjacent area or room, by attaching an IR reflector onto a preconceived position of a wall and by proper adjustment of the IR drivers 70, 70B and/or 90.

The advantages of using IR network are many, first is that most all of the electrical appliances can be integrated into IR network because most employ low cost IR remote control receivers. IR remote control devices are light, consuming very little power and are reliably operating all the functions of the appliance and at a low cost. Second advantage is the discussed optical connection or the in line of sight that limit the IR remote control commands to a confined area. Simply summarized, an IR command will only operate the appliance the user intend to operate by aiming the remote control device toward the appliance.

In contrast, command signals of a similar remote control device, such as RF wireless device, can reach for example, two different television sets or two air condition units in the apartment, house or office, and operate inadvertently an appliances that should not be operated. To prevent such inadvertent operation each RF wireless operated appliance must be allotted an individual ID code, or IP address, calling for more complex and long communication packets that are transmitted back and forth every time a command is intended for a given appliance. Since there are many types of repeated commands used, such as commanding volume or of temperature up-down, the repeated commands using RF wireless protocol are far longer and more complex than those simple and short commands used for IR remote control. From the above, it should be obvious that the line of sight or the optically connected IR remote control device, is an advantage because it cuts dramatically the data communication volume.

Figure 2A:
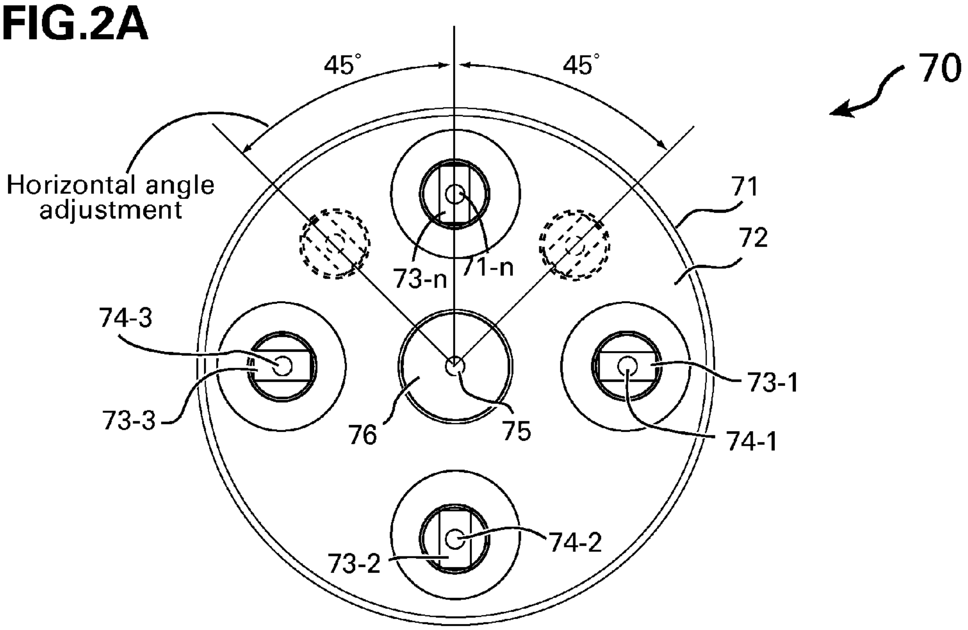
FIGS. 2A~2D are structural drawing of an adjustable ceiling mount IR driver of the preferred embodiment of the present invention.

The IR LED 74 of the ceiling driver 70 or 70B is used for directing an IR command to the appliance's IR receivers, such as the 101 of the television set and 121 of the air conditioner shown in FIG. 1. The LEDs 74 are shown in FIG. 2A as n number of IR transmitters 74-1, 74-2, 74-3 and 74-n. Similar IR LED TX are shown in the U.S. patent application Ser. No. 11/874,309 as IR transmitter 13 while the IR photo diode receivers that are shown as IR receiver 12, similar numbering are also used in FIGS. 4~11. However the LEDs 13 are the same as the LEDs 74 and the photo diodes or photo transistors 12 are the same as the IR receiver 75. The LED's 13 or 74 and the photo diodes 12 or 75 shown in FIG. 2A, have a defined transmission and receiving beam angle, such as 30° total beam coverage from center line or +15°-15° etc. The transmitted signal is attenuated to half of its specified power (measured in mW/sr) at the specified maximum angle. The transmitting power is similarly attenuated gradually from the full specified value at the center line, to half the value at the specified beam angle.

Similar is the receiving angle of an IR receiver such as the photo diodes 12 or 75. The specified receiving sensitivity is at its peak when the transmitted IR beam is directed to the receiver center line and gradually decreasing as the beam reaches the receiver at an increasing angle. It is obvious therefore, that the best condition for an IR network is to provide adjustable IR transmitters, such that each transmitter can be adjusted to directly beam the signals to a given IR receiver or to several IR receivers that are closely located. It is also obvious that it is preferable to provide an adjustable IR receiver for at least the IR ceiling drivers such as 70, 70B and/or the wall mount IR driver 90 shown in FIGS. 1, 2A, 3A and 4A.

FIG. 2A shows the IR ceiling driver 70 of the preferred embodiment, including the shown four IR transmitter 74, however any number of transmitters can be used with the IR ceiling driver 70. The IR ceiling driver body includes the fixedly mounted base 71 and a rotatable cover 72.

Figure 2B:
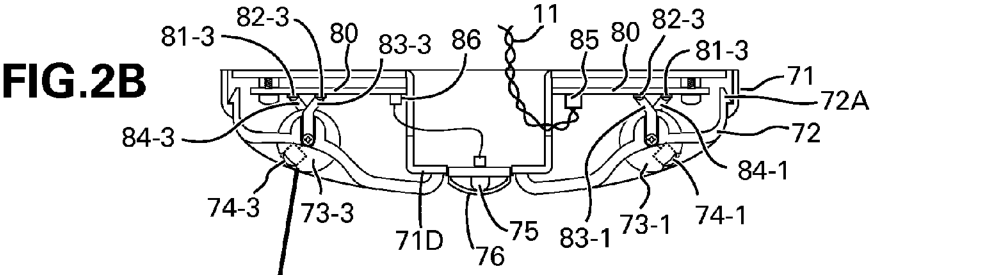

The cover 72 of the preferred embodiment IR driver 70 shown in FIG. 2B is attached to the rimmed base 71 by the attachment hooks 72A that engage the flange 71A of the base 71 by pushing the plastic cover upwards onto the base 71 however many other attachment structures can be used. With the hooks 72A engaging the flange 71A the cover 72 is supported by the base 71 and is guided and lightly pressured by a barrel like 71D or other protruding structure 71C shown in FIGS. 3B and 3D of the base center and by the spring contacts 83 and 84, so it can be firmly rotated into an adjusted position around the cover's center axis and around the IR receiver 75 as shown in FIG. 2B. The rotation angle of the cover 72 is determined by the number of the IR transmitters, and as shown in FIG. 2A a rotating angle of 90° or ±45° is needed to rotate the cover 72 so that the four IR transmitters can be positioned in any angle within the cover's horizontal rotation.

FIGS. 2A and 2B also show the rotating bodies of the IR transmitters 73-1~73-n, for adjusting the vertical direction of each individual IR transmitter 74. The wheel shaped bodies 73 each contain the IR LED transmitter 74 and is attached at the wheel center to the spring contacts 83 and 84 that connect the IR transmitter to a pair of circled slip surface contact 81 and 82 printed onto or attached to the printed circuit board (PCB) 80.

Figure 2C:
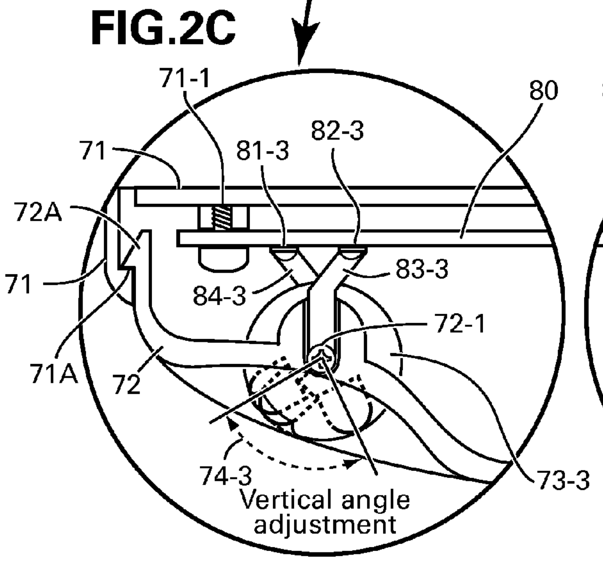
Figure 2D:
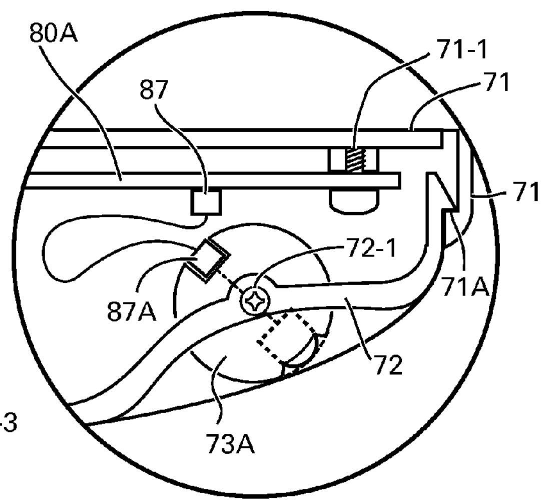

The spring contacts 83 and 84 are tightly attached to the two sides of the structural holder of the plastic molded cover 72 using two screws 72-1 shown in FIGS. 2C and 2D or any other known fasteners. The screws or other fasteners provide the pivot for rotating the wheels shaped body 73, the electrical contacts between the IR transmitter 74 and the spring contacts 83 and 84 and the pressure onto the wheel 73 for maintaining a friction between the wheel 73 and the structure of the cover 72 to hold the adjusted wheel in place after adjusting it by means of applying finger pressure to rotate the IR transmitter body 73.

The advantage of the structure shown in FIGS. 2B and 2C is that the attachment of the ceiling cover 72 is a simple push into the base 71 with no concern to any connecting wires or harnesses from the transmitters 74 to the PCB 80 that is attached to the base 71 using screws 71-1, or by other PCB locking means, such as snap-on molded structures and the like (not shown) that are well known. FIG. 2D shows a wheel structure 73A that is similar to the wheel structure 73, but does not include the connections via the contacts 83 and 84, instead the wheel assembly 73A is connected to the PCB 80A via an harness and connectors 87 and 87A. Such structure calls for connecting the IR transmitters prior to attaching the cover 72 into the base 71.

The IR receiver is shown in FIG. 2B as a fixed non adjustable photo diode or photo transistor 75, covered by an IR pass filter 76 and is connected by an harness assembly 86 to the PCB 80. The IR drivers 70, 70B and 90 are all shown connected through a twisted pair 11 to the terminal 85 of the PCB 80 or 80A for providing power to the IR driver, but instead the terminals 85 can be connected to a wired network 10 or to a wired network and power 10P, as disclosed in the U.S. patent application Ser. No. 11/874,309 referred to above and shown in FIGS. 9A, 9B and 9C. Alternatively, the IR drivers 70, 70B or 90 can be powered by a battery or rechargeable battery or by any other well known power supply or power sources.

The IR driver 70B shown in FIG. 3A includes n number of ball shaped bodies 73B for adjusting the positioning of each individual IR transmitter 74 in any direction, in contrast to the wheel shaped body shown in FIGS. 2B, 2C and 2D. The ball shaped body 73B is fasten to the cover 72B using ring like holder plate 79 and screws 79C shown in details in FIG. 3C. The ball is held in place slightly pressured between the springy ring plate 79 and the opening 79B of the cover 72B, such that slight pressure by a technician or the user onto the body 73B against the ceiling, or the wall mount IR driver 90, will release the holding pressure and provide for rotating the IR transmitter in any horizontal or vertical direction within the opening 79B as shown in FIG. 3C. The IR transmitter of the ball shaped body 73B is shown connected to the PCB 80A using cable harness and connectors 87 and 87A, but it could also be connected using spring contacts (not shown) that are an extension of the shown ring like holder 79. Otherwise the cover 72B and the base 71B are similar to the cover 72 and the base 71 shown in FIG. 2A Shown in FIG. 3B the IR receiver 75 is enclosed in a ball structure 77. Unlike the receiver 75 shown in FIGS. 2A and 2B the IR receiver 75 of FIG. 3D can be freely positioned in any horizontal and vertical direction within the opening 77B of the base 71B. The ball shaped body 77 includes an IR pass filter 76B and is fastened to the base 71B using springy ring plate 77A that fixes the ball body 77 to the base 71B by slight pressure, such that the installer or the user can apply some counter pressure by pushing the ball body up toward the ceiling or against the wall for adjusting the IR receiver direction while applying finger pressure. The IR receiver is shown connected to the PCB 80A using harness and connector 86 and 86A. Though not shown, n number of an adjustable IR receivers in a ball structure 77 can be included in the IR driver 70B by replacing the shown IR transmitters 74 with an IR receiver 75 and reconnecting the ball assembly 73B via harnesses and connectors 86 and 86A, same as the receiver assembly shown in FIG. 3D is connected. Similarly it is possible to change one or more IR transmitters 74 shown in FIG. 2D with IR receivers 75 in order to add n number of adjustable receivers to the IR driver 70 instead of or as addition to the fixed IR receiver 75 shown in FIG. 2A.

FIGS. 4A and 4B shows the wall mounted IR driver 90, which is similar to the ceiling mounted IR driver 70B, with the exception of its body that is shown in a rectangular shape, for mounting the base 91 onto a standard electrical box (not shown), and therefore the wall mounted IR driver 90 shown does not provide for rotating the cover 92 around a center axis. The individual IR transmitters 74-1~74-n however are identical to the transmitters 74 shown in FIGS. 3A and 3C, along with the ball shaped body 73B enclosing the IR transmitter 74, including the opening in the front cover 79B and the springy ring shaped holder 79, for holding the ball body 73B into place by slight pressure. Shown in FIGS. 4A and 4B are three IR transmitters 74-1-74-n, but any n number of IR transmitters 74 and receivers 75 can be incorporated into the wall mounted IR driver 90.

The IR receiver 75 along with the IR pass filter 76B and the ball body 77 shown in FIG. 4D are similar to the IR receiver 75, the IR pass filter 76B and the ball body 77 shown in FIG. 3D. Also similar is the ring shape holder 77A and the connector 86A connecting the shown IR receiver 75 to the PCB (not shown) of the wall mounted IR driver 90. Otherwise, the adjustments of the ball bodies 77 of the IR transmitters 74 and the IR receiver or plurality of receivers 75 are processed the same way as those of the ceiling mounted IR driver 70B, by pushing slightly the ball bodies inward against the wall and adjusting the transmitters 74 and/or the receiver 75 to any horizontal or vertical direction within the opening 79B or 77B in the front cover of the wall mounted IR driver 90.

Though the wall mounted IR driver 90 is discussed and shown for wall mounting only, there are no limitations in the way of installing the wall mounted IR driver 90, furthermore the IR driver 90 can be constructed for example in an horizontally or vertically elongated structure (not shown) containing n number of ball shaped bodies 73B including IR transmitters 74 and n number of ball shaped bodies 77 including IR receivers 75 for adjusting the IR transmitters and the IR receivers individually for “in line of sight” with relays, current sensors, keypads and remote control units of the present invention and in line of sight with appliances, by mounting the IR driver 90 in locations and on structures including ceilings that are not optically obstructed and best suited for “in line of sight” for the IR two way propagation. The electrical circuits of the IR drivers are not disclosed in this application as they are fully disclosed in The U.S. patent application Ser. No. 11/509,315 dated Aug. 24, 2006, but they are similar to the circuits shown in FIGS. 5D, 8A and 8B as is explained further below.

Figure 5A:
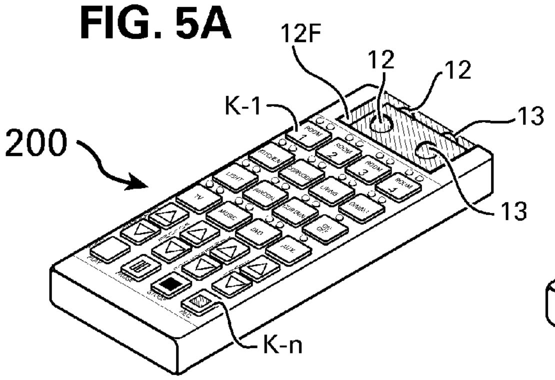
FIGS. 5A~5D are an illustration, front drawing and a block diagram of an hand held IR remote control device of the preferred embodiment of the present invention.
Figure 5B:
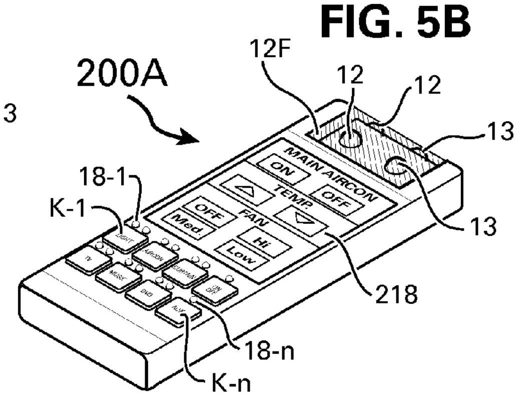

FIGS. 5A and 5B shows a hand held IR remote control device 200 of the preferred embodiment of the present invention, including two IR transmitters 13 and two IR receivers 12, positioned such that the user aiming the hand held remote control 200 toward an electrical switch 6D-IR or 6E-IR as shown in FIG. 1, will communicate without fail with the switch and with the IR ceiling mounted driver. As explained above, for an efficient IR communication network it is essential to direct the IR transmitter’s beam to the IR receiver within the beam half power angle and within the receiver’s sensitivity limiting angle. For this reason and as explained further below, the upward directed IR transmitter 13 and the IR receiver 12 enables the user to aim the hand held remote control device 200, the same way the user has become accustomed to operate a remote control, and that is by aiming the remote control device to the appliance such as the television set 100 or the air conditioner 120 shown in FIG. 1.

Figure 5C:
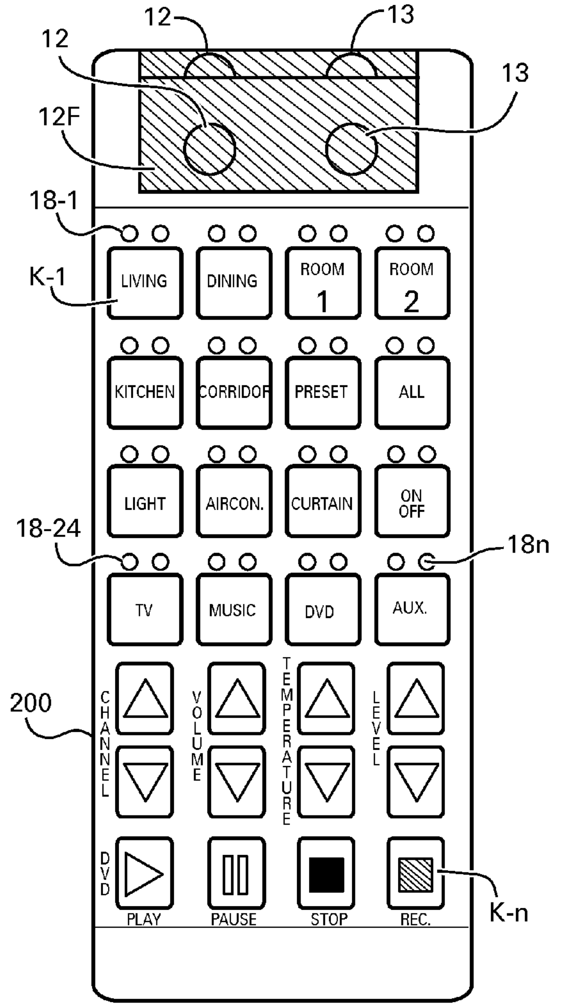

The IR remote control device 200 and 200A shown in FIGS. 5A, 5B and 5C incorporate n number of keys K-1~K-n and n number of indicators 18-1~18-n. The indicators 18 assigned to the keys K are provided, for example, to indicate the selected zone or room, the selected appliance, such as light or television or air condition, along with indicators for indicating the on-off status of each selected and/or operated appliance, or such as indicating all the appliances of a given room or zone and their status when a zone or a room is selected.

For example, it is preferable to have an indication of all the appliances that are connected to the home automation network, in each of the rooms or each zone, such that when the user touches a room or a zone key K, for example the living room key, the indicators 18 of all the appliances of the living room, that are included in the system such as the television 100, the air condition 120, lights and curtains (not shown) will automatically switch on, to light green for "off" status and red for "on" status. Such indicators 18, each positioned adjacent to an appliance select key K, offers the most convenient means for instant presentation of current status of all appliances at a glance. For enabling such simple conveniences, the IR receiver 12 of the IR remote control 200 must be in direct line of sight with an IR transmitter 74 of a ceiling IR driver 70 or 70B, and that is achieved by the upward mounted IR receiver 12 of the IR remote control 200.

As the IR remote control device 200 operates such appliances as the shown television 100 and the air condition 120, the advantage of the current invention is the ability of the hand held IR remote control 200 to transmit for example its standard "on" command to the television set and receive in return an "on status" data generated by the current sensor 4+6IR when the television set switches on, this switches the color of the television indicator 18 of the remote control device 200 to red (to indicate on state) immediately after its standard "on" command was propagated through the ceiling mounted IR receiver 75 or the receiver 12 of the current sensor 4+6IR for communicating the command to the video interphone controller, so that the controller can select the appropriate command from a lookup table and regenerate a pre recorded command (stored in the video interphone controller) through an IR transmitter 74 of the IR driver 70 or 70B back to the television set 100 and switch on the television 100, with all this exchange take place while the user is completely unaware of how the transaction is completed, because the user is aiming the remote control device 200 toward the television set 100 and not toward the ceiling, is the other important advantage of the present invention.

Figure 5D:
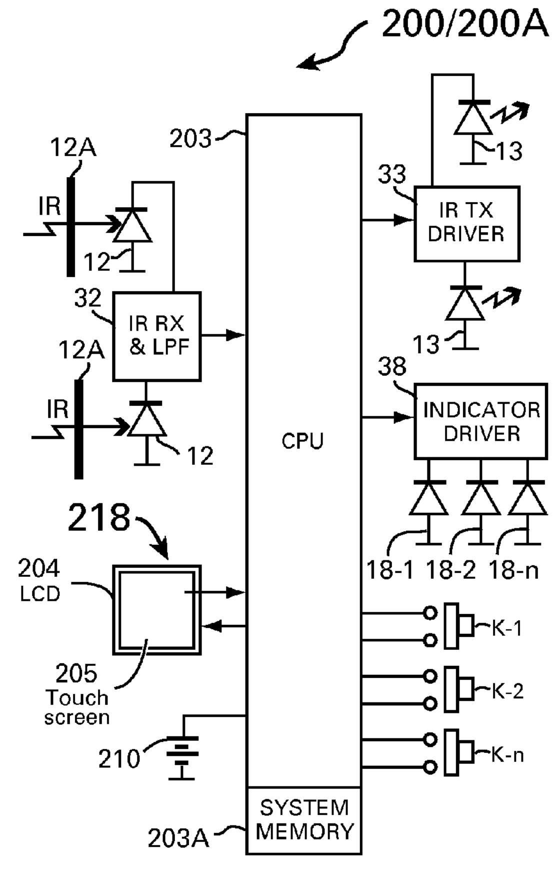

Shown in FIG. 5B is an IR remote control device 200A that is similar to the IR remote control 200, but includes an LCD assembly 218 comprising an LCD display 204 and a touch screen 205 shown in the block diagram of FIG. 5D. The difference between the remote controls 200 and 200A is the addition of such an LCD with a touch screen 218, that can display more details, such as temperature and/or display the selected television channel, and further enables to increase the remote control functions of the appliances by touch keys that are added to the LCD display program.

The shown remote control 200A includes both, the keys K1~Kn with corresponding indicators 18-1~18-n and the LCD assembly 218, but the remote control 200A can be used only with the LCD and touch screen 218, without the shown other keys K1~Kn and/or the indicators 18-1~18n. The difference between the use of key's and indicators versus the use of LCD and touch screen only, is the ease of operation and the ability to view the status of the appliances at a glance by looking at the fixed positioned indicators, as oppose to the need to read the display, because of the LCD display is changeable. However, the combination of both, keys K1~Kn with indicator 18-1~18-n combined with the shown LCD with touch screen 218 does offer instant status presentation and the added control-displays for the home automation system.

Shown in FIG. 5C are some of the details of the keys K setup, including room or zone/area select keys, such as living, dining, room number, kitchen and corridor, the appliances select keys such as TV, light, aircon, curtain, music, DVD and auxiliary, the operational select such as on-off key, channel select keys, volume up-down, temperature up-down, level up-down, a preset select and "all" (room or zones) select key. Also shown are a playback, pause, stop and record command keys for use with DVD or any other similar playback/recording appliance or device. The shown keys and the selected rooms, areas or zones are an example only, many other keys and other operations can be added to or removed from the shown keys and indicators of FIGS. 5A, 5B and 5C, as the case may be.

The electrical circuits of the IR remote control system such as shown in FIG. 5D are well known, be it the IR photo diodes or receivers 12, the IR pass filter 12A and the IR receiver & LPF processor 32 and the IR transmitter driver 33 including the IR LEDs 13 shown in FIG. 5D, are all well known, and available commercially at low cost in IC and molded packages by many manufacturers. The CPU 203 with the system memory 203A are also commonly available at low cost. Some CPUs combine the IR RX and LPF 32 and the IR TX driver 33 in the same IC package. The indicator driver 38 and the LED indicators 18 are commonly available, including LED drivers for driving multi color LEDs or single color LEDs. Similar are the silicon rubber keys k1~Kn, that are commonly used for remote control devices and the LCD 204 with a touch screen 205, that is used only with the remote control 200A, all of which are well known and commonly available. The remote controls 200 and 200A are operated by batteries or rechargeable batteries 210.

The relays and the current sensors along with all the devices referred to in this application and/or disclosed in the U.S. patent application Ser. No. 11/874,309 can communicate via two way IR signals (IR), RF wireless signals (RF), wired propagated data (W) and wired propagated data including power feed (WP). Though not all the devices are disclosed individually with all its communications options, the devices such as the relay 6D or 6E referred to in the U.S. patent application Ser. No. 11/874,309 can include two way IR circuit, such as 6D-IR or 6E-IR and can be extended to cover wired propagated data such as 6D-IR+W, or wired propagated data and power feed such as 6E-IR+WP. Same apply to all other devices including keypads, IR drivers and current sensors, the suffixes added to the referenced device identification number or characters indicate its communication facilities and its powering via the wired network.

Figure 6A:
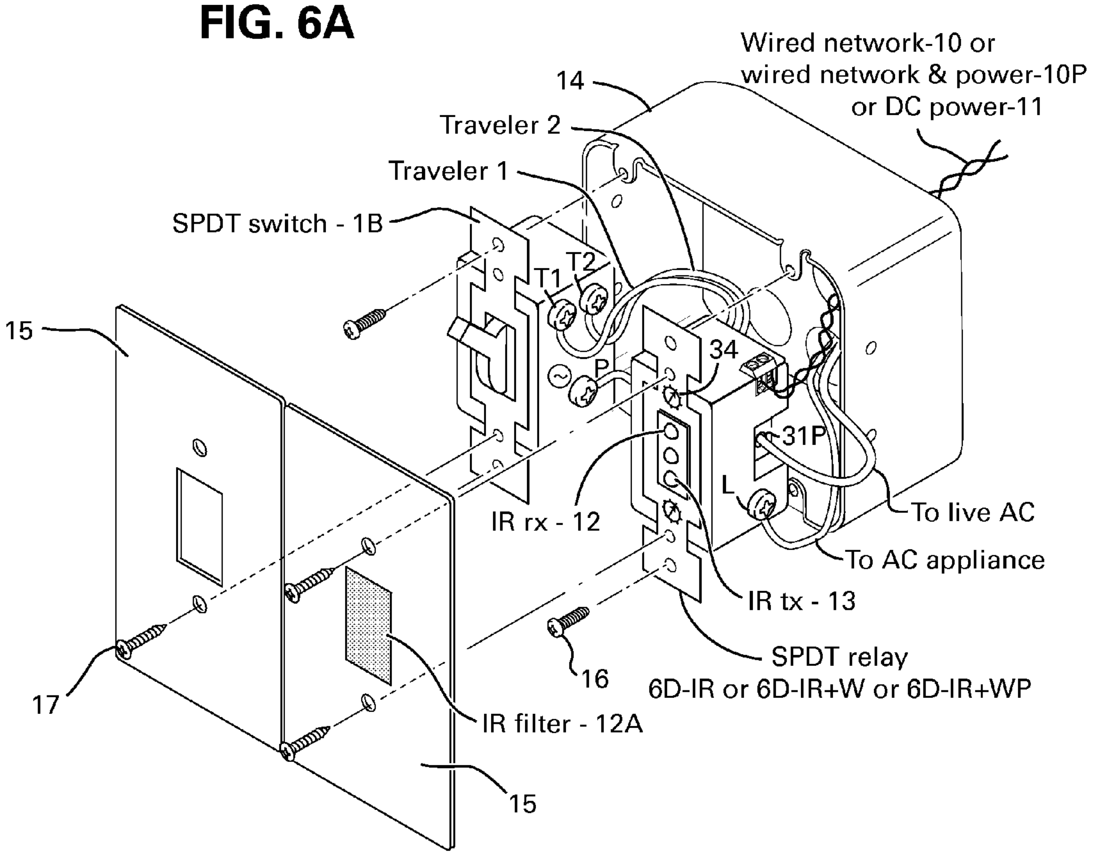
FIGS. 6A and 6B are exploded views showing the installation and connections of SPDT switch with SPDT and DPDT relay of the invention, operated via IR and wired network.
Figure 6B:
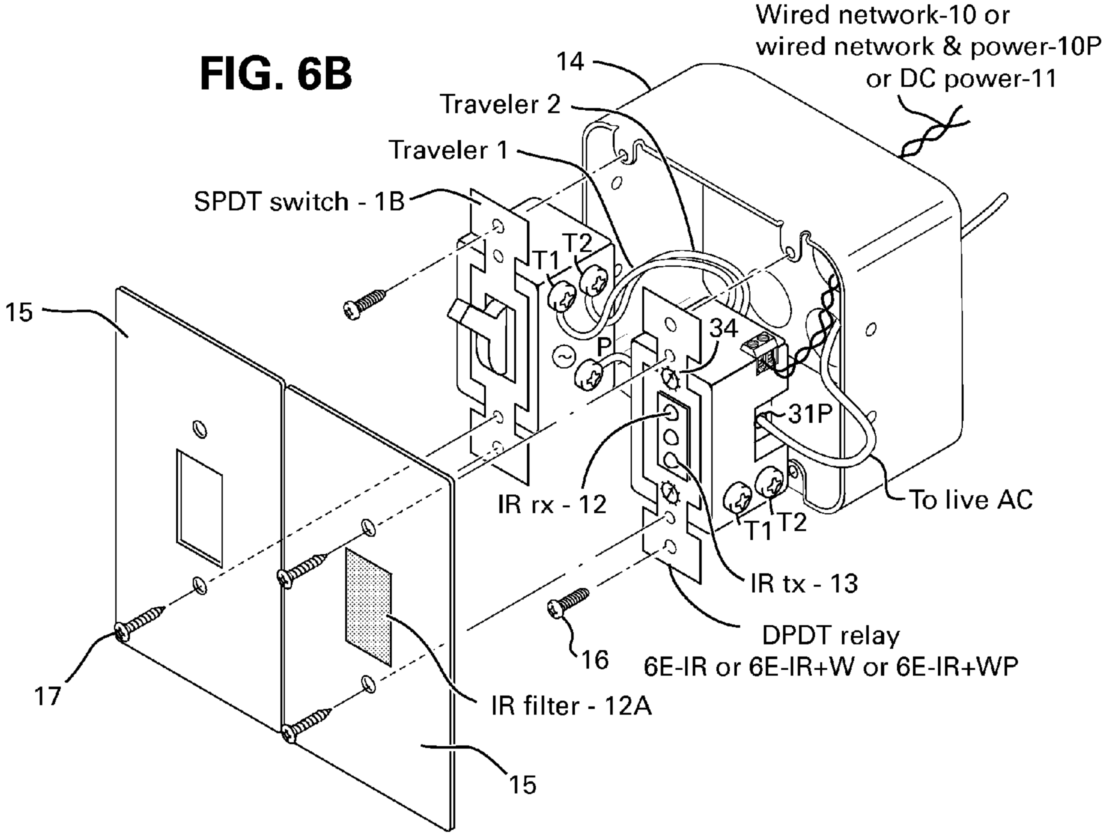

Shown in FIGS. 6A and 6B are the exploded views of the installation of the SPDT relay 6D-IR and the DPDT relay 6E-IR, that are disclosed in the referenced U.S. patent application Ser. No. 11/784,309. The significance in the installations shown in FIGS. 6A and 6B as well the shown in FIGS. 7A and 7B, is the connection of the AC live electrical power wire shown in all the drawings as passing through a passage 31P of the current sensing coil 31 shown in FIG. 7A and FIGS. 8A and 8B. As disclosed in the referenced application, the coil 31 will output an AC signal corresponding to the current drain through the AC live electrical wire by induction, without being connected to the live AC line.

By this the relays 6D-IR and 6E-IR and the current sensing unit 4+6IR will generate on-off status data, or data such as sleep mode on the basis of the current drain of the appliance connected through the AC outlet 4 via the current sensor 4+6IR, or switched through any of the electrical switches 1B or the relays 6D-IR or 6E-IR shown in FIG. 1. As the shown relays 6D-IR and 6E-IR and the current sensor 4+6IR are all provided with IR transmitter 13 shown in FIGS. 6A, 6B, 7A and 7B, for updating the remote control device 200 or 200A directly and/or through the ceiling or wall mounted IR driver 70, 70B or 90 with the on-off status of the appliances in the room or areas such as shown in FIG. 1.

FIGS. 8A and 8B show the block diagrams of the two types of relay circuits 6IR+W and 6IR+WP, with FIG. 8A showing the block diagram that includes the IR receiver 12 and the IR transmitter 13 circuits for the two way IR communication, similar to the circuits of FIG. 5D disclosed above. The block diagram further comprises the two way wired driver 37 for connecting the relays 6D-IR+W and 6E-IR+W to a wired network 10. The circuit of FIG. 8A is powered by a power source that can be selected from an independent power supply, power adaptor, battery, rechargeable battery or any other available power source.

Figure 9A:
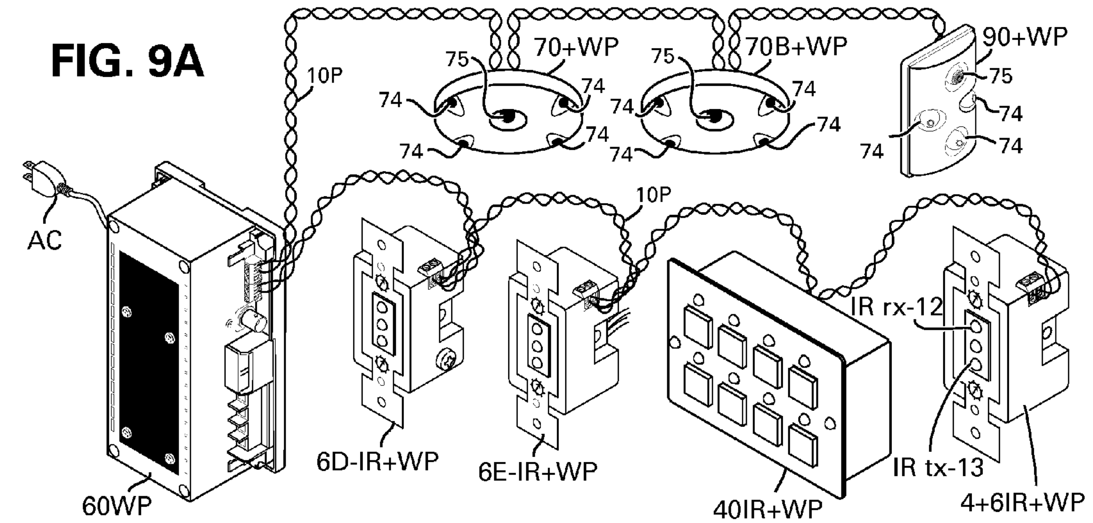
FIGS. 9A~9C are illustrations showing the communication networks for the home automation including a distributor and power supply, IR drivers and the key panel or keypad of the preferred embodiment of the present invention.

FIG. 8B shows an identical circuit to the circuit shown in FIG. 8A with the exception of the two way wired driver 37P that includes the power extracting circuit, for extracting the power fed through the wired network 10P for powering the relay units 6D-IR+WP and 6E-IR+WP, the current sensor unit 4+6IR+WP and any of the IR drivers 70+WP, 70B+WP and 90+WP of the present invention and shown in FIG. 9A. The DC power extracted from the wired network 10P is fed to the CPU 30 and to all the connected other circuits of the relays, the current sensor 4+6IR+WP and the IR drivers 70+WP, 70B+WP and 90+WP.

FIGS. 8A and 8B are fully disclosed in the U.S. patent application Ser. No. 11/874,309 referred to above and are very similar to all the other discussed circuits in this application. As will be explained later, the same two way wired data drivers with power extracting circuit 37P, or the wired data drivers 37 (without power extracting circuit) are included in the IR drivers 70+WP or 70+W, 70B+WP or 70B+W and 90+WP or 90+W. Similar components that form the IR receivers including the photo diode 12, the IR pass filter 12A and the IR receiver circuit 32. Same apply to the IR transmitters including the LEDs 13 and the driver 33 and the indicators driver 38 that are incorporated into the current sensors and the remote control devices 200 and 200A. The same also apply to the CPU 30 and the system memory 30A, a similar CPU and memory are incorporated in the current sensor 4+6IR, the IR drivers 70, 70B and 90 and the remote control devices 200 and 200A.

The circuit and components that are shown in the block diagram of FIGS. 8A and 8B but are not used in devices such as the IR drivers and remote control are the relay driver 36, the relay coil 6L and the current sensor 31 that are not needed for the IR drivers 70, 70B or 90, nor for the remote control devices. The address switches 34-1~34-n may or may not be used with the IR drivers disclosed, and as will be explained later, the address switches are necessary for the keypad 40IR shown in FIGS. 9A~9C and 11A~11B.

Figure 9B:
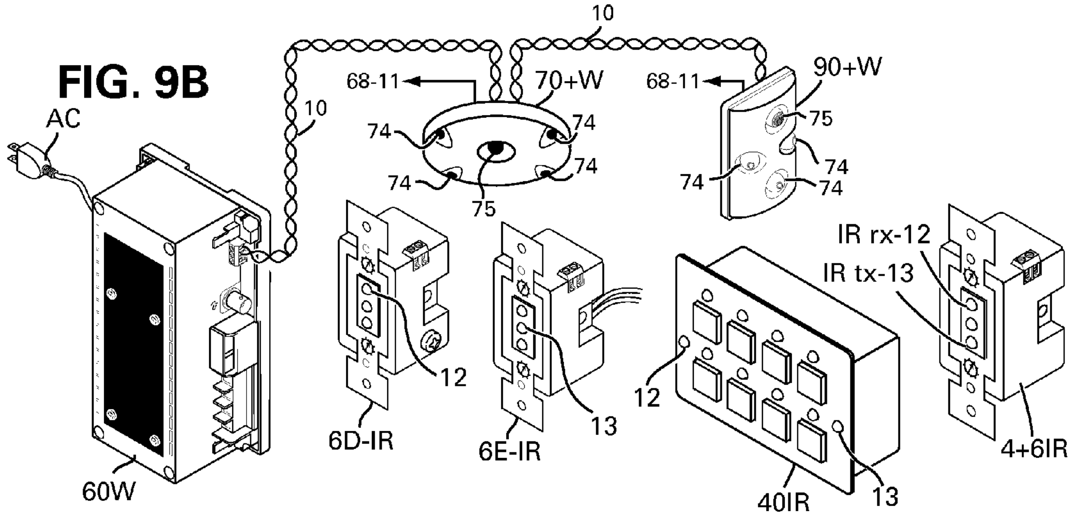
Figure 9C:
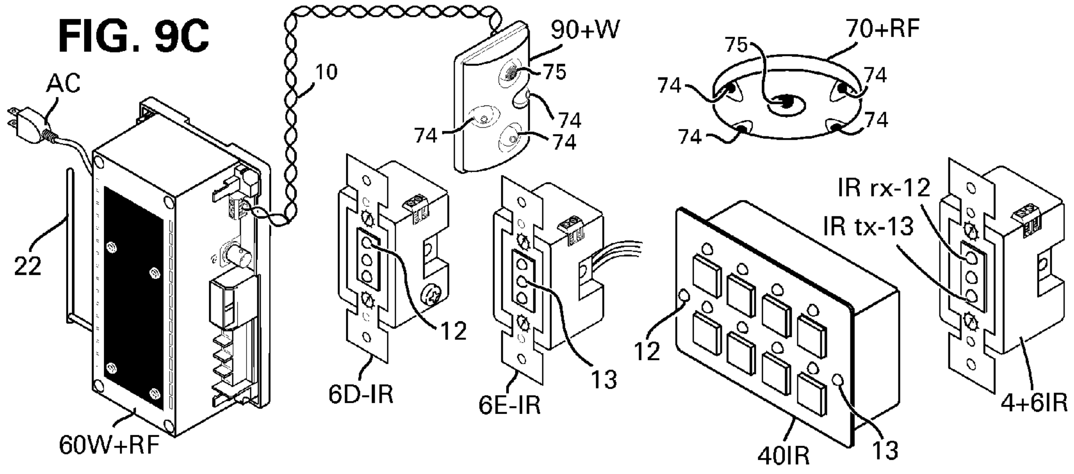

Shown in FIGS. 9A~9C are three examples of network combinations of the present invention, with FIG. 9A showing a wired network with power feed 10P connected from the distributor and power supply 60WP in dual cascaded lines, with one of the cascading lines connects the IR drivers 70+WP, 70B+WP and 90+WP and the other cascading line connects the relays 6D-IR+WP and 6E-IR+WP, the keypad 40IR+WP and the current sensor 4+6IR+WP. The shown two distributed lines of the network 10P feed the power to all the referred above devices on the line, for communicating two way directly between the devices via IR signals and propagating the data between the devices and the distributor 60WP via the wired network 10P and for operating the devices and the appliances via a combination of propagated data via the wired network 10P and IR signals communication.

Figure 10:
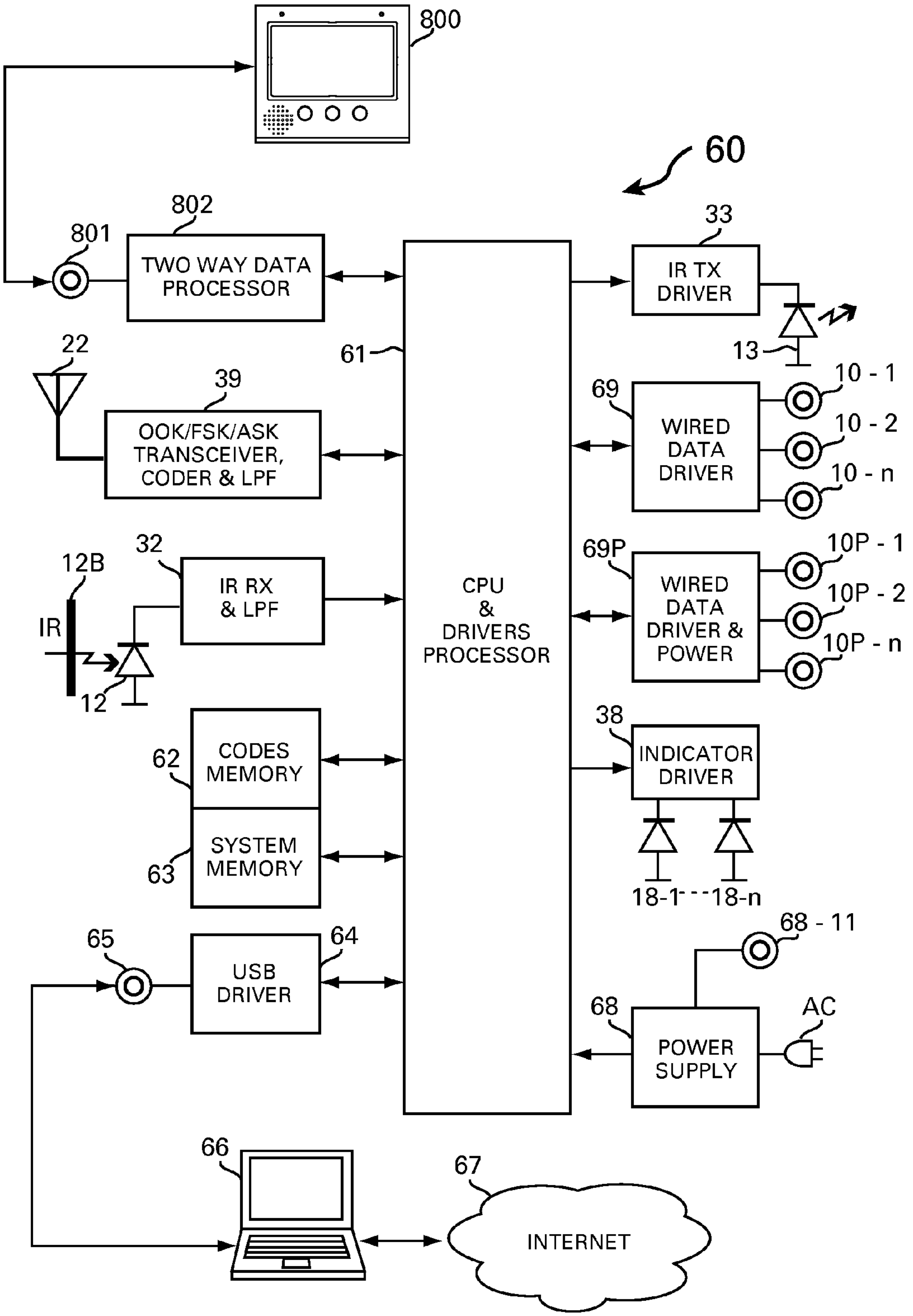
FIG. 10 is a block diagram of the distributor and power supply, the communication drivers and the connections for remote operation via the Internet of the home automation system of the invention.

Shown in FIG. 10 is a block diagram of an home automation distributor and power supply 60, including wired data and power circuit 69P for distributing regulated current to the different devices on the wired network 10P comprising the relays 6D-IR+WP and 6E-IR+WP, the current sensor 4+6IR+WP, a keypads 40IR+WP and the IR drivers 70+WP, 70B+WP and 90+WP. The devices powered via the network 10P include the two way data driver and power extract circuit 37P shown in FIGS. 8B and 11B as described above and in the referenced U.S. patent application Ser. No. 11/874,309. Further the distributor with power supply 60 processes and propagate the information (data, commands, control and status) to and from the home automation controller, the video interphone or the shopping terminal 800. In the following description the command, statuses and the data may be expressed separately, but the terms command or commands cover all the communicated information including data, commands, control and status one or two ways.

As described in the referenced U.S. patent application Ser. No. 11/509,315 one of the advantages of using the video interphones or the shopping terminals for managing the home automation is the ability to create fixed indexes and common protocols to the different commands and status reports, enabling the use of a simple "cover all", low cost remote control device 200 for operating diverse appliances of the system. The common protocols are processed by and recorded into the memory of the home automation controller, the video interphone or the shopping terminal 800 and/or are installed into the memories 62 and 63 of the distributor with power supply 60 of FIG. 10, indexed to the different room/areas and the appliances addresses.

FIG. 9B shows another system setup in which the IR drivers 70+W and 90+W, for example, can be connected for communicating with the distributor with power supply 60W via the wired network 10 of the wired data driver 69, but be powered separately via individual power supply, or directly from the power supply 68 via the power terminal or connector 68-11 shown in FIG. 10. In FIG. 9B setup the relays 6D-IR, 6E-IR, the current sensor 4+6IR and the keypad 40IR shown can communicate two way with the distributor with power supply 60W via the IR drivers 70+W and 90+W shown. Similarly the IR devices can communicate using a combined IR and RF drivers and/or IR and RF repeaters drivers that are not shown, but are shown and explained in the referenced U.S. patent application Ser. No. 11/509,315, such as the disclosed IR driver 70+RF shown in FIG. 9C.

The circuits of the distributor with power supply 60 are fully explained in the referenced U.S. patent application Ser. No. 11/874,309. Briefly, the two way data processor 802 of the distributor with power supply 60 shown in FIG. 10 can communicate the received commands including statuses to the home automation controller, the video interphone or the shopping terminal 800 via the connector or terminal 801 and communicate with the connected relays 6D-IR+W, 6D-IR+WP and 6E-IR+W, 6E-IR+WP or the current sensor 4+6IR+W, 4+6IR+WP and the keypad 40IR+W, 40IR+WP through the wired network drivers 69 and/or 69P respectively, for propagating commands and controls to operate the appliances. If an RF transceiver is included in any of the network devices, such as the IR driver 70-RF shown in FIG. 9C, the commands and controls can be communicated via the RF transceiver 39 through the antenna 22 shown in FIGS. 9C and 10.

The codes memory 62 and the system memory 63 record and contain all the data pertaining the system, such as the addresses including room/area and the appliance number addresses, the indexing of all commands and a lookup table for converting the communicated standard commands to the selected appliance's original operating commands. Such lookup table enables the use of the common hand held two way remote control device 200 or 200A to operate the entire home automation system.

Further, the USB driver 64 shown in FIG. 10 can be connected via USB connector 65 to a PC 66 that is downloaded with a program that includes the command codes, addresses, indexes and other data pertaining the system, downloaded from the home automation controller, the video interphone or the shopping terminal 800. By this setup the distributor with power supply 60 enables a resident of an apartment or a house or the manager and the personnel of an office to remotely connect to the PC 66 (via the Internet 67) and receive appliances status including alarm in process, and/or generate controls and commands for operating the electrical appliances such as switching on or off the water boiler, the air condition and similar.

The wired network 10P similar to the wired network 10 including the RF and IR propagated signals between the devices shown in FIGS. 9A~9C communicate with the home automation controller, the video interphone or the shopping terminal 800 shown in FIG. 10 at random or at a controlled time, using token passing mechanism generated by the CPU 61 of the distributor with power supply 60 of FIG. 10 or the home automation controller 800. The distributor with the power supply 60 is shown in FIG. 10 to include all the four discussed networks, the wired network with power feed 10P, the wired network 10, the IR and the RF network. Alternatively the distributor with power supply 60W shown in FIG. 9B can incorporate the driver circuit 69 only for feeding up to n wired networks via the connectors 10-1~10-n, or the distributor with power supply 60WP may incorporate the driver circuit 69P only form wired networks with power feed 10P via connectors 10P-1~10P-n.

A distributor with power supply 60WP+IR (not shown) can incorporate only the RX and TX circuits 32 and 33 for operating an IR network and the distributor with power supply 60RF can incorporate only the RF transceiver circuit 39 for operating the RF wireless network. The distributor with power supply 60W+RF operates both the wireless RF and the wired data network 10 as shown in FIG. 9C. When a distributor with power supply 601R, discussed in the referenced U.S. patent application Ser. No. 11/874,309, can be installed in a location that is in line of sight (optically connected) with the relays, the outlet and/or the keypad, the use of the IR driver 90 may not be necessary.

Note that a distributor 60W, 60RF and 601R without power supply does not require the power supply terminal 68-11, nor the wired network with power feed driver 69P, or the wired network with power feed terminals 10P-1~10P-n. For distribution and exchange of commands and data only, a distributor without power supply, such as 60W, 60RF and 601R is referred to hereafter as a “distributor”.

As explained the different networks, independently or combined provide for the devices on the network to communicate randomly, or in organized timing using token passing mechanism. The relatively slow speed data, and the non frequent incidents of communicating on-off command and appliances status, makes a continuous round the clock token passing mechanism an unnecessary activity over the network that may cause delays in the operation of the IR remote control devices 200 and 200A.

Therefore, the preferred embodiment of the present invention uses signal sensing mechanism for permitting the devices to communicate only when no signal is present for a duration of n milliseconds. Such delays in communicating non frequent and random short commands and status data, does not affect the efficiency and the speed needed for the operating of the home automation of the present invention. However, any type of well known token passing mechanism, program and circuit and/or any well known program and signal sensing circuit can be used to communicate data, control, command and status on the different networks and the combination of networks of the present invention.

Figure 11A:
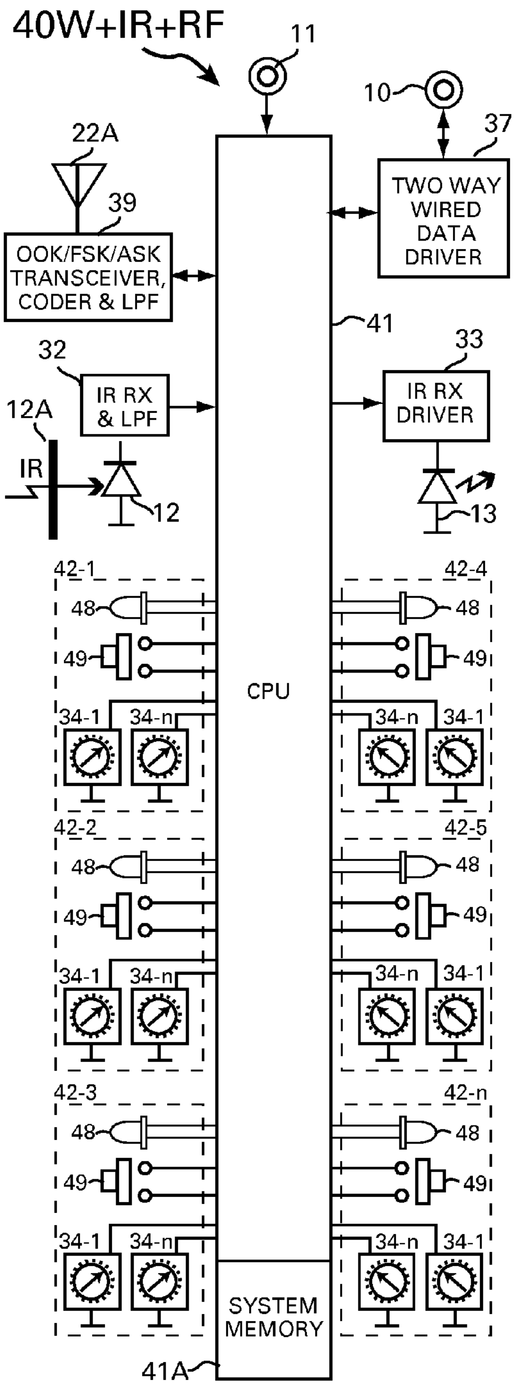
FIGS. 11A and 11B are block diagrams of a key panel or keypad for switching on and off a selected appliances via wired network, RF wireless network or IR networks.
Figure 11B:
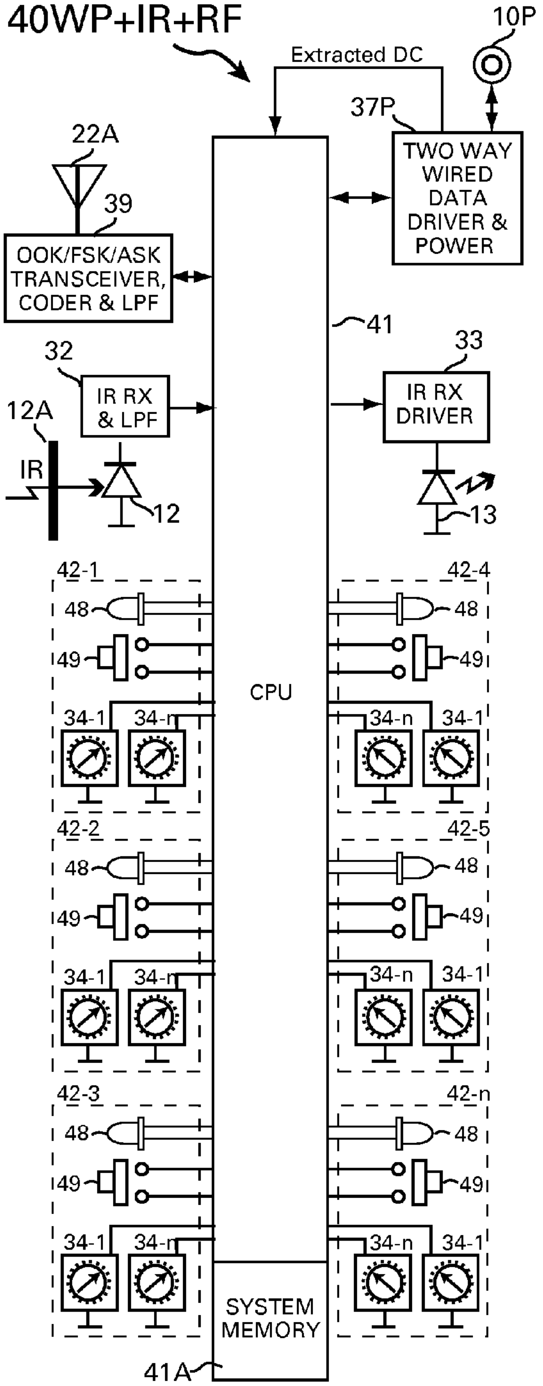

The keypads 40W+IR+RF and 40WP+IR+RF shown in FIGS. 11A and 11B employ essentially the same circuits employed and described above for all the other devices of home automation system of the present invention. The shown CPU 41 and the system memory 41A are similar to the CPU 30 and memory 30A of FIGS. 8A and 8B. The digital rotary switches 34-1~34-n and the circuits 37 for the wired network 10, 37P for the wired network and power extract 10P, 32 and 33 for the IR network and 39 for the RF network are identical circuits with the shown circuits for the relays, the AC outlets, the IR drivers and other devices such as add-on circuit for motion detectors, magnetic switch, humidity and temperature control and others as explained in the referenced U.S. patent application Ser. No. 11/874,309.

Each of the shown keypads 40W, 40WP, 40IR or 40RF incorporate the specific circuits for a specific network such a circuit 37 for wired network, circuit 37P for wired network 10P with power extractor, circuit 39 for wireless network and circuits 32 and 33 for IR network. However it is possible to include all the four circuits into single keypad for having a common keypad 40 communicating via any of the networks and powered through the network.

The keypads or the key panels 40IR shown in FIGS. 9A~9C are in essence an array of switches and indicators similar to the IR remote control device 200 for mounting onto standard electrical boxes, such as shown as box 14 in FIGS. 6A and 6B, or on walls or incorporated into a table top case (not shown), powered for example by a battery and communicate via IR similar to the remote control device 200. Several keypads can be installed for example in kitchens, dinning room, entrance and main bedroom etc, or in offices main entrance and/or in the manager room of an office. The basic key functions are to switch on and off lights and appliances in the home, apartment, office or building, and indicate the lights or the appliances on and off status. For this reason the preferred embodiment of the present invention uses the two or n digital rotary switches 34-1 and 34-n shown in FIGS. 11A and 11B for assigning an address to each individual key, enabling the user to select which key will operate and monitor (via the key’s indicator) a given appliance status.

Each shown key 49 in FIGS. 11A and 11B is grouped into a group 42 shown as groups 42-1~42-n in a dashed line boxes, containing indicator 48 and the two or n digital switches 34-1~34-n. As explained above, the digital switches 34 shown as rotary switches, are the preferred embodiment of the present invention, because they provide for simple user assignment of each key to a given appliance. However any number or type of digital, binary and other switches including well known DIP switches can be used. Similarly each key can be assigned an address by installing the codes into the memory 41A via the home automation controller, the video interphone or the shopping terminal 800 shown in FIG. 10, or directly from a PC incorporating such program for installing the addresses and their particulars to the memories 30A, 41A, 62 and 63 shown in FIGS. 8A, 8B, 10, 11A and 11B.

The function of the indicator 48 shown in each key group 42, similar to the indicators 18 shown for the add-on relays 6D or 6E and the AC outlets 4+6WP. The indicators 18 and 48 can be multi color LED indicator such as the well known red-green-orange LEDs. The indicators can be programmed, for example, to flash green when command is processed, or flashed red to indicate that other commands are currently processed. The indicator can light green to show appliance is off, red for appliance is on and yellow, for example, that the appliance is in a sleep mode.

Figure 12:
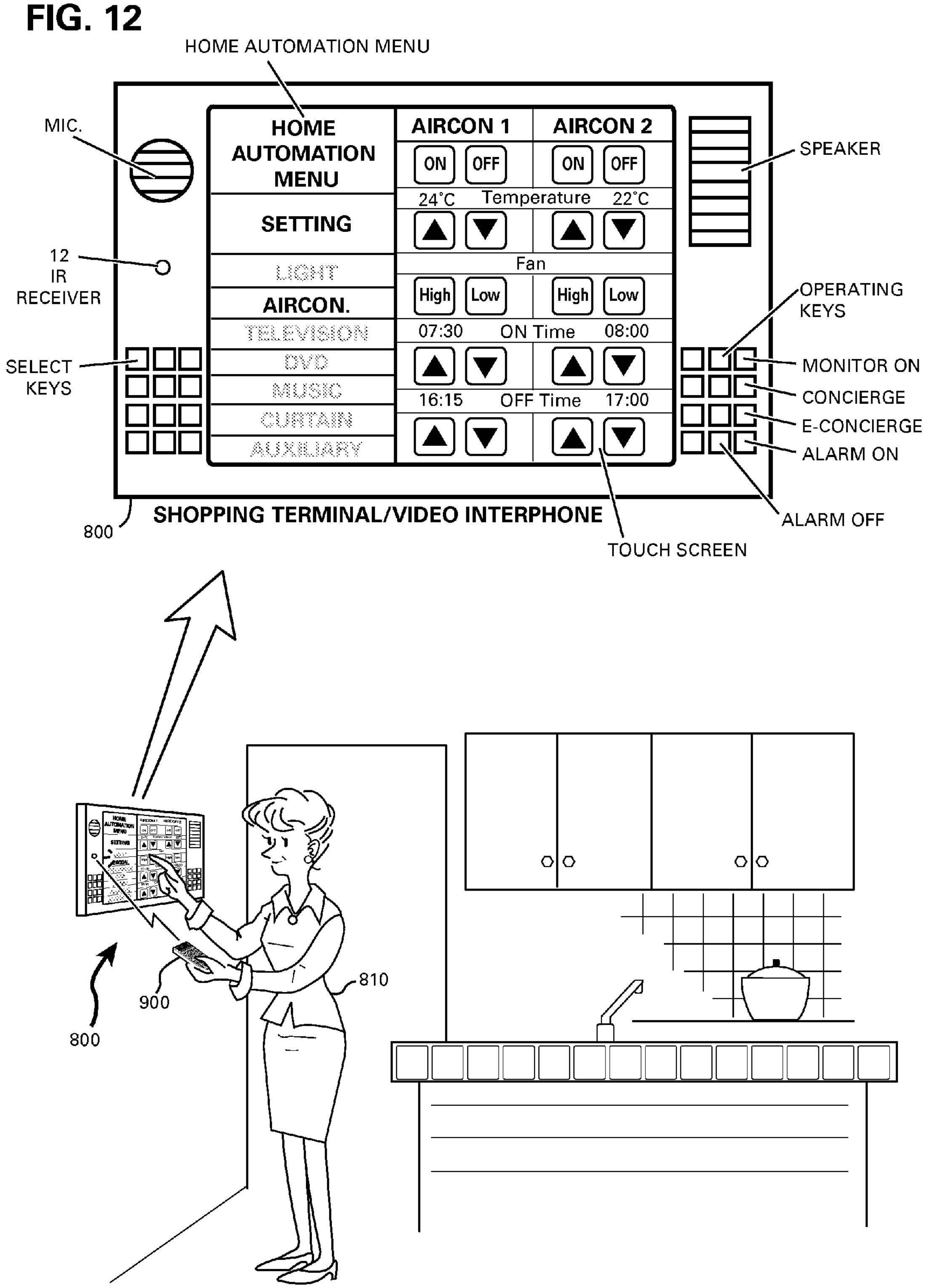
FIG. 12 is an illustration showing the recording of an IR command of an appliance included in the home automation system into the video interphone or the shopping terminal.

FIG. 12 shows the video interphone or the shopping terminal 800 that includes an IR receiver 12 and is programmed to receive and index a command into an indexed lookup table from any known IR remote control device of a known appliance, such as television set 100, air conditioner 120, iPod player, background music player, DVD recorder/player, and any other third party known IR remote controlled electrical consumer device. Such method and apparatus for recording third party remote control commands are disclosed in U.S. Pat. No. 7,290,702.

The illustrated user of the system 810 is shown pointing such third party IR remote control device 900, while a setting menu is displayed, for recording the device's original command into the memory of the video interphone or the shopping terminal 800 and into the indexed lookup table, so that a common command such as TV on or volume up generated by the remote control device 200 or 200A for a given room or zone will be regenerated in accordance with the stored command of the original appliance's remote control device and communicated to the IR driver of the selected room or zone for transmittal to the remotely commanded appliance. The indexed lookup table is also used for redirecting standards commands such as light on-off to a remotely operated relay such as 6D-IR exchanged between devices in one room or zone to other rooms and/or zones.

It is clear from the explanations above, that the remote control device 200 or 200A along with the IR drivers 70, 70B and 90 of the present invention provide a simple method and apparatus for introducing a simple and effective IR network for home automation alongside with relays, current sensors, keypads and the commonly used manual switches and for controlling third party appliances in any of the room or the zones of a home, an office or other buildings, offering simple low cost local and remote operation including status reporting, in conjunction with video interphone or shopping terminals or with similar home automation controller. It is also clear that the present invention provides for remote operation of the home automation via the Internet, using PC and/or PDA devices, and receive updated status from the system locally via indicators, or through the video interphone or the shopping terminals display, and remotely through a PC or PDA devices.

It is further clear that the problems associated with the "line of sight", that hinders the propagation of IR signals, are effectively solved by the introduction of the adjustable IR drivers and the addition of upward directed IR receiver and IR transmitter to the remote control device of the present invention, and the combining of the IR drivers with wired and/or wireless network provide a total low cost solution for the home automation in a convenient simple way, without obstructing the interiors and architecture design.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for coupling at least one of a wall mount and a ceiling mount adjustable IR driver with a two way IR network of a home automation system controlled by a main controller selected from a group comprising a dedicated controller, a video interphone and a shopping terminal, said IR driver includes a plurality of adjustable IR transmitters and at least one IR receiver for propagating IR commands to at least one of hand held IR remote control units, electrical appliances and devices selected from a group comprising a remotely operated relays, an AC current sensors and a keypads, and for receiving from at least one of said devices a status data, said IR commands include at least a power on-off command for switching an appliance on and off and said status data pertaining to the on and off statuses of a commanded appliance, comprising the steps of:

a. Mounting at least one said IR driver onto at least one of said wall and said ceiling;

b. adjusting at least one of said IR transmitters to be in line of sight with at least one of said appliances and said devices;

c. propagating said commands from one of said main controller, said keypads and said hand held remote control units to at least one of said remotely operated relays and said appliances through said adjustable IR transmitters; and d. receiving said data pertaining said on and off statuses through said IR receiver.

2. The method for coupling an adjustable IR driver with a two way IR network according to claim 1, wherein at least one of said remote control units is multidirectional and includes at least two IR receivers and two IR transmitters with one of said two IR receivers and one of said two IR transmitters are forward directed and the other of said two IR receivers and said two IR transmitters are upward directed, comprising the further steps of:

e. aiming said multidirectional remote control unit toward at least one of said appliances and said devices for operating said commanded appliance; and f. propagating at least one way said commands between said multidirectional remote control unit and said adjustable IR driver via at least one of said upward directed IR receiver and IR transmitter.

3. The method for coupling an adjustable IR driver with a two way IR network according to claim 1, wherein said multidirectional remote control unit includes at least one indicator selected from a group comprising LEDs, LCDs and combinations thereof for indicating said statuses, comprising the further steps of:

g. receiving said status data via at least one of said two IR receivers and driving said indicator to indicate said on-off status pertaining said commanded appliance.

4. The method for coupling an adjustable IR driver with a two way IR network according to claim 3, wherein at least one of said LCDs include touch screen for operating said multidirectional remote control unit.

5. The method for coupling an adjustable IR driver with a two way IR network according to claim 4, wherein said multidirectional remote control unit is operated by said touch screen and at least one key.

6. The method for coupling an adjustable IR driver with a two way IR network according to claim 1, wherein said home automation includes multiple networks selected from a group consisting of a wired network, a wired network with power feed, an RF network, said IR network and combinations thereof, said IR driver and said devices include circuits and drivers to communicate via said multiple networks and wherein said step of propagating said commands and said step of receiving said data comprising the further step of exchanging said commands and said data via said multiple networks and via a distributor included in said multiple networks with said main controller.

7. The method for coupling an adjustable IR driver with a two way IR network according to claim 6, wherein said distributor is a combined distributor with power supply and wherein at least one of said IR driver and said devices includes a power extract circuit for its power feed and is connected to said distributor with power supply via said wired network with power feed, comprising the further steps of extracting said power and applying the extracted power to a power terminal of said IR driver and said devices that include said power extract circuit.

8. The method for coupling an adjustable IR driver with a two way IR network according to claim 6, wherein said distributor include a central processing unit and a recordable memory with an indexed lookup table program for storing original IR commands of said appliances and for redirecting said commands and said data exchanges with said appliances via at least one of said remotely operated relays, said AC current sensors and said IR driver, comprising the further steps of:

converting the exchanged said commands into said original IR commands of said commanded appliance as recorded in said indexed lookup table; and propagating said original IR commands to said commanded appliance via said IR driver.

9. The method for coupling an adjustable IR driver with a two way IR network according to claim 1, wherein said at least one IR receiver is adjustable and said step of adjusting at least one IR transmitter comprises the further step of adjusting said at least one IR receiver to be in line of sight with at least one of said devices.

10. An adjustable IR driver including plurality of adjustable IR transmitters and at least one IR receiver for exchanging two way IR commands in line of sight with at least one of IR remote control units, electrical appliances and devices selected from a group comprising remotely operated relays, AC current sensors and keypads of a home automation system;

said IR driver for attachment to a ceiling includes a circle base and an horizontally rotatable cover attached to said base, a printed circuit board for interconnecting said IR transmitters and said IR receiver through at least one of wire harness and circled slip electrical contacts with engaging spring contacts;

each of said IR transmitters enclosed in one of a vertically rotatable pivoted wheel and a spherically rotatable ball are mounted onto said cover and are firmly adjustable; and said IR receiver mounting is selected from one of said firmly adjustable onto said cover, enclosed in one of said rotatable pivoted wheel and said rotatable ball and a fixed position selected from one of onto a protruding surface of said base and a surface of said cover.

11. An adjustable IR driver including plurality of adjustable IR transmitters and at least one adjustable IR receiver for exchanging two way IR commands in line of sight with at least one of IR remote control units, electrical appliances and devices selected from a group comprising remotely operated relays, AC current sensors and keypads of a home automation system;

said IR driver for attachment to one of a wall, a pole and a ceiling includes a base, a cover and a printed circuit board for interconnecting said IR transmitters and said IR receiver, wherein each of said IR transmitters and said IR receiver enclosed in a spherically rotatable ball is mounted onto said cover and is firmly adjustable.

12. A multidirectional IR remote control unit for exchanging IR commands with at least one adjustable IR driver of a two way IR network of a home automation system including electrical appliances and devices selected from a group comprising remotely operated relays, AC current sensors and keypads;

said IR commands include at least a power on-off command for switching an appliance on and off and a status data pertaining to the on and off statuses of a commanded appliance, said multidirectional remote control unit includes at least two IR receivers for receiving said status data from at least one of said devices and said IR drivers and two IR transmitters;

one of said two IR receivers and one of said two IR transmitters are forward directed for exchanging said commands at least one way with one of said appliances and said devices, with the other one of said two IR receivers and the other one of said two IR transmitters are upward directed for exchanging said commands at least the other way of said two way with said adjustable IR driver.

13. The multidirectional IR remote control unit according to claim 12, wherein said remote control unit further includes at least one indicator selected from a group comprising LEDs, LCDs and combinations thereof for indicating at least said on and off statuses pertaining to said commanded appliance on the basis of said status data received via at least one of said two IR receivers.

14. The multidirectional IR remote control unit according to claim 13, wherein at least one of said LCDs includes touch screen for operating said remote control unit.

15. The multidirectional IR remote control unit according to claim 14, wherein said remote control unit further includes at least one key for operating said remote control unit.

16. The adjustable IR driver according to claim 10, wherein said home automation system is operated via multiple networks selected from a group consisting of a wired network, a wired network with power feed, an RF network, an IR network and combinations thereof and said IR driver and said devices include circuits and drivers to communicate via said multiple networks; and wherein said home automation system is controlled by a main controller selected from a group comprising a dedicated controller, a video interphone and a shopping terminal and said exchanging of said commands includes the propagation of data, pertaining to an on-off status of at least one of said appliances, from at least one of said devices via said multiple networks and via a distributor included in said multiple networks to said main controller.

17. The adjustable IR driver according to claim 16, wherein said distributor is a combined distributor with power supply and wherein at least one of said IR driver and said devices include power extract circuit for its power feed and is connected to said distributor with power supply via said wired network with power feed for extracting said power and applying the extracted power to a power terminal of said IR driver and said devices that include said power extract circuit.

18. The adjustable IR driver according to claim 16, wherein said distributor include a central processing unit and a recordable memory with an indexed lookup table program for storing original IR commands of said appliances and for redirecting said commands and said data exchanges with said appliances via at least one of said remotely operated relays, said AC current sensors and said IR driver; and wherein said commands for operating a commanded appliance are converted into an original IR commands of said commanded appliance as recorded in said indexed lookup table, and propagating said original IR commands to said commanded appliance via said IR driver.

19. The adjustable IR driver according to claim 11, wherein said home automation system is operated via multiple networks selected from a group consisting of a wired network, a wired network with power feed, an RF network, an IR network and combinations thereof and said IR driver and said devices include circuits and drivers to communicate via said multiple networks; and wherein said home automation system is controlled by a main controller selected from a group comprising a dedicated controller, a video interphone and a shopping terminal and said exchanging of said commands includes the propagation of data, pertaining to an on-off status of at least one of said appliances, from at least one of said devices via said multiple networks and via a distributor included in said multiple networks to said main controller.

20. The adjustable IR driver according to claim 19, wherein said distributor is a combined distributor with power supply and wherein at least one of said IR driver and said devices include power extract circuit for its power feed and is connected to said distributor with power supply via said wired network with power feed for extracting said power and applying the extracted power to a power terminal of said IR driver and said devices that include said power extract circuit.

21. The adjustable IR driver according to claim 19, wherein said distributor include a central processing unit and a recordable memory with an indexed lookup table program for storing original IR commands of said appliances and for redirecting said commands and said data exchanges with said appliances via at least one of said remotely operated relays, said AC current sensors and said IR driver; and wherein said commands for operating a commanded appliance are converted into an original IR commands of said commanded appliance as recorded in said indexed lookup table, and propagating said original IR commands to said commanded appliance via said IR driver.

* * * * *